US011949258B2

(12) United States Patent
Kataya et al.

(10) Patent No.: US 11,949,258 B2
(45) Date of Patent: Apr. 2, 2024

(54) CONTROL SYSTEM, CONTROL METHOD AND INTEGRATED CIRCUIT FOR SECONDARY BATTERY PROTECTION

(71) Applicants: Hirotaka Kataya, Tokyo (JP); Iwao Kitamura, Tokyo (JP)

(72) Inventors: Hirotaka Kataya, Tokyo (JP); Iwao Kitamura, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 348 days.

(21) Appl. No.: 17/445,777

(22) Filed: Aug. 24, 2021

(65) Prior Publication Data
US 2022/0069592 A1 Mar. 3, 2022

(30) Foreign Application Priority Data

Aug. 28, 2020 (JP) ................................. 2020-145077

(51) Int. Cl.
*H02J 7/00* (2006.01)
(52) U.S. Cl.
CPC ........ *H02J 7/0019* (2013.01); *H02J 7/00302* (2020.01); *H02J 7/00304* (2020.01);
(Continued)
(58) Field of Classification Search
CPC .. H02J 7/0019; H02J 7/00302; H02J 7/00304; H02J 7/00306; H02J 7/0047;
(Continued)

(56) References Cited

U.S. PATENT DOCUMENTS 5,804,944 A 9/1998 Alberkrack et al.
6,965,502 B2 * 11/2005 Duffy ...................... G06F 1/305
361/111
(Continued)

FOREIGN PATENT DOCUMENTS

CN 1251694 4/2000
JP 2010-057249 3/2010
(Continued)

OTHER PUBLICATIONS

Office Action dated Jan. 12, 2021 with respect to the corresponding Japanese Patent Application No. 2020-145077.
(Continued)

*Primary Examiner* — M Baye Diao
(74) *Attorney, Agent, or Firm* — IPUSA, PLLC

(57) ABSTRACT

A control system includes a secondary battery protection apparatus and a device. The secondary battery protection apparatus includes one or more monitoring terminals each provided in a path different from power paths, each monitoring terminal being operable for monitoring a potential at a negative electrode of a given secondary battery cell among a plurality of the secondary battery cells. The secondary battery protection apparatus includes one or more internal switches each of which is provided in an internal line between the negative electrode of a given secondary battery cell and a given monitoring terminal. The device includes a balance control circuit that adjusts, based on potentials monitored by the monitoring terminals, a current flowing into a line path that includes a corresponding internal line. The balance control circuit controls balance among the cell voltages for the secondary battery cells, based on the adjusted current.

10 Claims, 16 Drawing Sheets

(52) U.S. Cl.
CPC ........ *H02J 7/00306* (2020.01); *H02J 7/0047* (2013.01); *H02J 7/00712* (2020.01)

(58) Field of Classification Search
CPC .. H02J 7/00712; H02J 7/0014; H02J 7/00714; H02J 7/007182; H02J 7/0016; H02J 7/0029; Y02E 60/10; H01M 10/4257; H01M 10/441; H01M 2010/4271
USPC ........................................................ 320/118
See application file for complete search history.

(56) References Cited

U.S. PATENT DOCUMENTS

| | | | | |
|---|---|---|---|---|
| 8,264,204 | B2* | 9/2012 | Nagaoka | B60L 58/22 |
| | | | | 320/136 |
| 9,373,953 | B2* | 6/2016 | Kimura | H02H 3/207 |
| 9,735,567 | B2 | 8/2017 | Muramoto et al. | |
| 10,505,376 | B2 | 12/2019 | Sugeno et al. | |
| 10,516,276 | B2* | 12/2019 | Yamauchi | H02J 7/00304 |
| 10,833,512 | B2* | 11/2020 | Remboski | H02J 7/00302 |
| 10,910,851 | B2* | 2/2021 | Saito | H02J 7/0036 |
| 11,190,029 | B2* | 11/2021 | Niki | H01M 10/425 |
| 2013/0181630 | A1* | 7/2013 | Taipale | H05B 45/10 |
| | | | | 315/210 |
| 2019/0181665 | A1* | 6/2019 | Shibata | H02J 7/0031 |

FOREIGN PATENT DOCUMENTS

| | | | | |
|---|---|---|---|---|
| JP | 2013-162581 | | 8/2013 | |
| JP | 2014-044061 | | 3/2014 | |
| JP | 2016-073066 | | 5/2016 | |
| JP | 2016-086635 | | 5/2016 | |
| JP | 2019106880 A | * | 6/2019 | ............ H02J 7/0021 |
| KR | 20180076268 A | * | 7/2018 | .......... H02J 7/00304 |

OTHER PUBLICATIONS

Office Action dated Apr. 25, 2022 with respect to the corresponding Indian patent application No. 202124038705.

* cited by examiner

FIG.16

| STATE OF SECONDARY BATTERY PROTECTION CIRCUIT | | STATE OF CHARGER | DISCHARGE CONTROL CIRCUIT | CHARGE CONTROL CIRCUIT | TERMINAL P- | INTERNAL SWITCH | | | | TERMINAL BSM | TERMINAL BSL |
|---|---|---|---|---|---|---|---|---|---|---|---|
| | | | | | | SWITCH 21 | SWITCH 22 | SWITCH 23 | SWITCH 24 | | |
| NORMAL CONDITION | | – | ON | ON | – | ON | OFF | ON | OFF | BM (VBM) | B– (VSS) |
| DETECTION OF OVERCHARGE | EITHER OF TWO CELLS | – | ON | OFF | Hi-Z | OFF | ON | ON | OFF | BM (VBM) | P– (VM) |
| | BOTH OF TWO CELLS | – | ON | OFF | Hi-Z | OFF | ON | OFF | ON | P– (VM) | P– (VM) |
| DETECTION OF OVERDISCHARGE | | CHARGER IS UNCOUPLED | OFF | ON | Pull-up | OFF | ON | OFF | ON | P– (VM) | P– (VM) |
| | | CHARGER IS COUPLED | OFF | ON | Pull-up | ON | OFF | ON | OFF | BM (VBM) | B– (VSS) |
| DETECTION OF DISCHARGE-OVERCURRENT | | – | OFF | ON | Pull-Down | OFF | ON | OFF | ON | P– (VM) | P– (VM) |
| DETECTION OF CHARGE-OVERCURRENT | | – | ON | OFF | Hi-Z | OFF | ON | OFF | ON | P– (VM) | P– (VM) |
| DETECTION BY TERMINAL BS1 | | | ON | ON | – | OFF | ON | ON | OFF | BM (VBM) | P– (VM) |
| DETECTION BY TERMINAL BS2 | | | ON | ON | – | ON | OFF | OFF | ON | P– (VM) | B– (VSS) |

CONTROL SYSTEM, CONTROL METHOD AND INTEGRATED CIRCUIT FOR SECONDARY BATTERY PROTECTION

CROSS-REFERENCE TO RELATED APPLICATION

This application claims priority under 35 U.S.C. §119 to Japanese Patent Application No. 2020-145077, filed Aug. 28, 2020, the contents of which are incorporated herein by reference in their entirety.

BACKGROUND

1. Technical Field

The present disclosure relates to a control system, a control method, and an integrated circuit for secondary battery protection.

2. Description of the Related Art

Japanese Unexamined Patent Application Publication No. 2010-57249, which is also referred to as Patent document 1, discloses a charge device that charges a battery pack. The battery pack includes a plurality of secondary battery cells coupled in series and includes a midpoint terminal coupled at a node between the secondary battery cells. The charge device includes a charge control microcomputer that causes the battery pack to be charged or discharged using the midpoint terminal to thereby control balance between cell voltages. The charge control microcomputer calculates two cell voltages based on a voltage between a positive terminal and a negative terminal of a given battery pack, as well as using a voltage between the midpoint terminal and the negative terminal. If a difference between the two cell voltages is equal to or exceeds a predetermined value, balancing between the cell voltages is controlled. In such a battery pack, a protection FET is provided between a given terminal and a given secondary battery cell.

[Citation List]
[Patent Document]
Patent document 1: Japanese Unexamined
Patent Application Publication No. 2010-57249

SUMMARY

The present disclosure provides a control system. The control system includes a plurality of secondary battery cells electrically coupled in series. The control system includes a plurality of power paths each electrically coupled in series with a corresponding secondary battery cell among the plurality of secondary battery cells. The control system includes at least one switching element inserted in a given power path. The control system includes a secondary battery protection apparatus configured to control the switching element such that the secondary battery cells are protected. The control system includes a device configured to control balance among cell voltages for the respective secondary battery cells. The secondary battery protection apparatus includes an anomaly detecting circuit configured to detect an anomaly of the secondary battery cells. The secondary battery protection apparatus includes one or more monitoring terminals each provided in a path different from the power paths, each monitoring terminal being operable for monitoring a potential at a negative electrode of a given secondary battery cell among the plurality of the secondary battery cells. The secondary battery protection apparatus includes one or more internal lines, each internal line being between the negative electrode of the given secondary battery cell and a given monitoring terminal. The secondary battery protection apparatus includes one or more internal switches, each internal switch being provided in a given internal line and configured to be turned on or off based on a result of anomaly detection performed by the anomaly detecting circuit. The device includes a balance control circuit configured to adjust, based on potentials monitored by the one or more monitoring terminals, a current flowing into a line path that includes a corresponding internal line among the one or more internal lines, the balance control circuit being configured to control the balance among the cell voltages for the plurality of the secondary battery cells, based on the adjusted current.

The present disclosure provides a control method for execution by a device. The device monitors potentials at one or more negative electrodes of a plurality of secondary battery cells electrically coupled in series, each secondary battery cell being protected by a secondary battery protection circuit that controls at least one switching element provided in a given power path among a plurality of power paths, and each power path being electrically coupled in series with a corresponding secondary battery cell among the plurality of secondary battery cells. The secondary battery protection apparatus includes an anomaly detecting circuit configured to detect an anomaly of the secondary battery cells. The secondary battery protection apparatus includes one or more monitoring terminals each provided in a path different from the power paths, each monitoring terminal being operable for monitoring a potential at a negative electrode of a given secondary battery cell among the plurality of the secondary battery cells. The secondary battery protection apparatus includes one or more internal lines, each internal line being between the negative electrode of the given secondary battery cell and a given monitoring terminal. The secondary battery protection apparatus includes one or more internal switches, each internal switch being provided in a given internal line and configured to be turned on or off based on a result of anomaly detection performed by the anomaly detecting circuit. The control method includes adjusting, based on potentials monitored by the one or more monitoring terminals, a current flowing into a line path that includes a corresponding internal line among the one or more internal lines. The control method includes controlling balance among the cell voltages for the plurality of the secondary battery cells, based on the adjusted current.

The present disclosure provides an integrated circuit for secondary battery protection. The integrated circuit for secondary battery protection includes a plurality of power paths each electrically coupled in series with a corresponding secondary battery cell among a plurality of secondary battery cells electrically coupled in series. The integrated circuit for secondary battery protection includes at least one switching element inserted in a given power path. The integrated circuit for secondary battery protection includes one or more control circuits configured to control the at least one switching element such that the plurality of secondary battery cells are protected. The integrated circuit for secondary battery protection includes an anomaly detecting circuit configured to detect an anomaly of the secondary battery cells. The integrated circuit for secondary battery protection includes one or more monitoring terminals each provided in a path different from the power paths, each monitoring terminal being operable for monitoring a potential at a negative electrode of a given secondary battery cell among the plurality of the secondary battery cells. The integrated circuit for secondary battery protection includes one or more internal lines, each internal line being between the negative electrode of the given secondary battery cell and a given monitoring terminal. The integrated circuit for secondary battery protection includes one or more internal switches, each internal switch being provided in a given internal line and configured to be turned on or off based on a result of anomaly detection performed by the anomaly detecting circuit. The one or more monitoring terminals are configured to output respective monitored potentials, upon occurrence of a condition in which an external device adjusts, based on the potentials monitored by the one or more monitoring terminals, a current flowing into a line path that includes a corresponding internal line among the one or more internal lines, in conjunction with a condition in which the external device controls balance among the cell voltages for the plurality of the secondary battery cells, based on the adjusted current.

BRIEF DESCRIPTION OF THE DRAWINGS

FIG. 16 is a diagram illustrating an example of switching control and connection conditions of terminals, with respect to each state of a secondary battery protection circuit.

DETAILED DESCRIPTION

Related art information relevant to the present disclosure recognized by the inventors of this application will be provided below. In the related art described in Patent document 1, a voltage drop is caused by on resistance of a pair of protection FETs, which is provided between a given terminal and a given secondary battery cell, and consequently a voltage between terminals of a midpoint terminal and the given terminal may be higher than the actual cell voltage. As a result, accuracy in controlling balance between cell voltages may be decreased.

The present disclosure provides a control system, a control method, and an integrated circuit for secondary battery protection that can control balance among cell voltages for a plurality of secondary battery cells coupled in series.

One or more embodiments of the present disclosure will be described below with reference to drawings.

<First embodiment>

Figure 1:
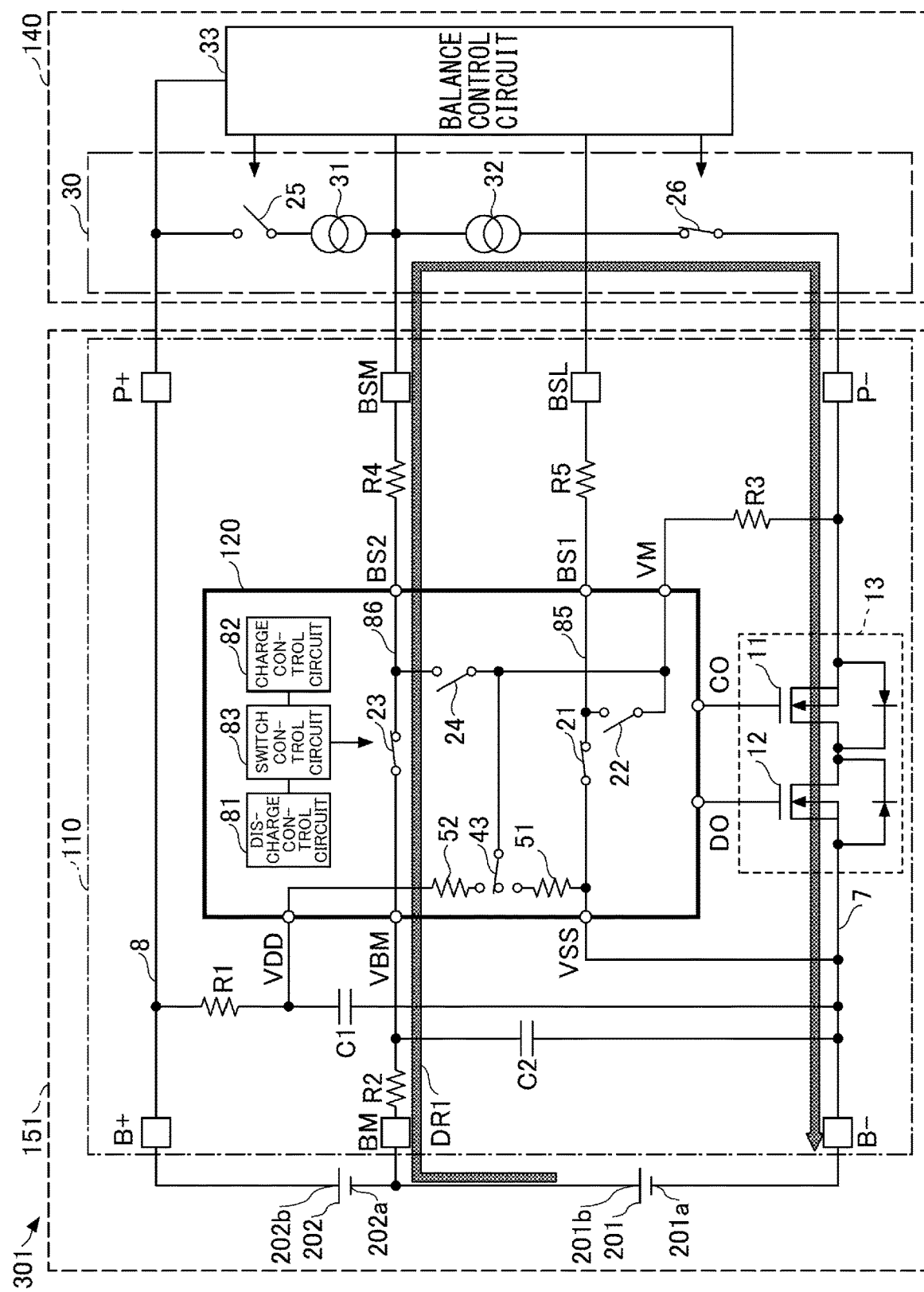
FIG. 1 is a diagram illustrating an example of the configuration of a control system according to a first embodiment, including a first discharge path used under a normal condition in which an anomaly of a plurality of secondary battery cells is not detected.

FIG. 1 is a diagram illustrating an example of the configuration of a control system according to a first embodiment. A control system 301 illustrated in FIG. 1 is a system that controls balance between cell voltages for multiple (in this example, two) secondary battery cells 201 and 202 coupled in series. The control system 301 includes an external device 140 and a battery pack 151.

The external device 140 is a device to be coupled to the battery pack 151. The external device 140 may be a charger that charges the battery pack 151, or may be a device that operates with power supplied from the battery pack 151. A specific example of the device to operate with power supplied from the battery pack 151 includes an electronic device, such as a smartphone, a tablet, or a mobile phone.

The external device 140 includes a balance control circuit 33 that controls the balance between cell voltages for the secondary battery cells. The balance control circuit 33 will be described below.

The battery pack 151 is a component that accommodates the series-coupled secondary battery cells 201 and 202, and is used when the battery pack 151 is coupled to the external device 140. The battery pack 151 includes the secondary battery cells 201 and 202 and a secondary battery protection apparatus 110.

The secondary battery cells 201 and 202 are rechargeable battery cells. A specific example of a secondary battery includes a lithium ion battery, a lithium polymer battery, or the like.

The secondary battery cell 201 is an example of a first secondary battery cell. The secondary battery cell 201 includes a positive electrode 201*b* and a negative electrode 201*a*. The positive electrode 201*b* is an example of a first positive electrode. The negative electrode 201*a* is an example of a first negative electrode at which a potential is a lowest potential among potentials at negative electrodes, which are low potential-side electrodes, of multiple secondary battery cells. The secondary battery cell 202 is an example of a second secondary battery cell. The secondary battery cell 202 includes a positive electrode 202*b* and a negative electrode 202*a*. The positive electrode 202*b* is an example of a second positive electrode. The negative electrode 202*a* is coupled to the positive electrode 201*b*.

The secondary battery protection apparatus 110 operates using a power source that is constituted by the secondary battery cells 201 and 202. By controlling the charge or discharge in the secondary battery cells 201 and 202, the secondary battery protection apparatus 110 protects the secondary battery cells 201 and 202 from overdischarge or the like. For example, the secondary battery protection apparatus 110 includes a switching circuit 13, a protection integrated circuit (IC) 120, resistors R1, R2, R3, R4, and R5, and capacitors C1 and C2. The secondary battery protection apparatus 110 also includes a substrate not illustrated on which the electronic components described above are mounted.

A specific example of the substrate includes a printed circuit board. A terminal B−, a terminal B+, a terminal BM, a terminal P−, a terminal P+, a terminal BSL, and a terminal BSM are provided with respect to the substrate. Each of the terminals is, for example, an electrode formed in the substrate. Further, power paths 7 and 8 are provided in the substrate.

The terminal B− is an example of a low side terminal on the battery-side. The terminal B− is coupled to the negative electrode 201*a* of the secondary battery cell 201, where a potential at the negative electrode 201*a* is a lowest potential among potentials for the secondary battery cells coupled in series. The terminal B+ is an example of a high side terminal on the battery-side. The terminal B+ is coupled to the positive electrode 202*b* of the secondary battery cell 202, where a potential at the positive electrode 202*b* is a highest potential among potentials for the secondary battery cells coupled in series. The terminal BM is an example of a battery monitoring terminal. The terminal BM is coupled at a node between adjacent secondary battery cells that are among the secondary battery cells coupled in series. In this example, the terminal BM is coupled at a node between the positive electrode 201*b* of the secondary battery cell 201 and the negative electrode 202*a* of the secondary battery cell 202.

The terminal P− is an example of a low side terminal on a load-side. The terminal P− is coupled to a ground terminal of the external device 140. The terminal P+ is an example of a high side terminal on the load-side. The terminal P+ is coupled to a power supply terminal of the external device 140.

The terminal B− and the terminal P− are coupled by a low-side power path 7. The power path 7 is a current path between the terminal B− and the terminal P−, and a charge current or discharge current flows into the power path 7. The power path 7 is coupled in series with the negative electrode 201*a* of the secondary battery cell 201.

The terminal B+ and the terminal P+ are coupled by a high-side power path 8. The power path 8 is a current path between the terminal B+ and the terminal P+, and a charge current or discharge current flows into the power path 8. The power path 8 is coupled in series with the positive electrode 202*b* of the secondary battery cell 202.

The terminal BSL is an example of a first monitoring terminal. The terminal BSL is provided in a path different from the power paths 7 and 8, and is operable for monitoring a potential at the negative electrode 201*a* of the secondary battery cell 201. The terminal BSL is to be coupled to a low potential-side monitoring unit of the balance control circuit 33. The terminal BSM is an example of a second monitoring terminal. The terminal BSM is provided in a given path different from the power paths 7 and 8, and is operable for monitoring a potential at the negative electrode 202*a* of the secondary battery cell 202. The terminal BSM is to be coupled to a high potential-side monitoring unit of the balance control circuit 33.

A switching circuit 13 is inserted in the power path 7 between the terminal B− and the terminal P−. The switching circuit 13 is, for example, a series circuit of a charge control transistor 11 and a discharge control transistor 12. By turning the charge control transistor 11 off, the power path 7 into which the charge current to the secondary battery cells 201 and 202 flows is interrupted, and thus the charge current is prohibited from flowing to the secondary battery cells 201 and 202. Also, by turning the discharge control transistor 12 off, the power path 7 into which the discharge current from the secondary battery cells 201 and 202 flows is interrupted, and thus the discharge current is prohibited from flowing to the secondary battery cells 201 and 202.

Each of the charge control transistor 11 and the discharge control transistor 12 is, for example, an N-channel metal oxide semiconductor field effect transistor (MOSFET). The charge control transistor 11 is a switching element that is inserted in the power path 7, such that the forward direction of a parasitic diode of the charge control transistor 11 coincides with a direction in which the discharge current from the secondary battery cells 201 and 202 flows. The discharge control transistor 12 is a switching element that is inserted in the power path 7, such that the forward direction of a parasitic diode of the discharge control transistor 12 coincides with a direction in which the charge current into the secondary battery cells 201 and 202 flows.

The protection IC 120 is an example of an integrated circuit for secondary battery protection. The protection IC 120 operates using a power source that is constituted by the secondary battery cells 201 and 202. By controlling the switching circuit 13, the protection IC 120 protects the secondary battery cells 201 and 202 from overdischarge or the like. For example, by turning the charge control transistor 11 off, the protection IC 120 protects the secondary battery cells 201 and 202 from an anomaly of charging (e.g., overcharge, overcurrent or charge-overcurrent that flows in the discharging direction of the cells, or the like). Further, the protection IC 120 protects the secondary battery cells 201 and 202 from an anomaly of discharging (e.g., overdischarge, overcurrent or discharge-overcurrent that flows in the discharging direction of the cells).

The protection IC 120 includes a terminal VDD, a terminal VSS, a terminal VBM, a terminal DO, a terminal CO, a terminal VM, a terminal BS1, and a terminal BS2. Those terminals are external terminals for coupling an internal circuit of the protection IC 120 with the exterior of the protection IC 120.

The terminal VDD is an example of a high-side power supply terminal that is coupled to the power path 8. The terminal VDD is coupled to the positive electrode 202b of the secondary battery cell 202, via the terminal B+. In this example, the terminal VDD is coupled to the positive electrode 202b of the secondary battery cell 202, via a resistor R1 and the terminal B+. The resistor R1 and the capacitor C1 constitute a CR filter.

The terminal VSS is an example of a low-side power supply terminal that is coupled at a node in the power path 7 between the negative electrode 201a of the secondary battery cell 201 and the switching circuit 13. The terminal VSS is a ground terminal that is coupled to the negative electrode 201a of the secondary battery cell 201, via the terminal B−.

The terminal VBM is an example of an intermediate monitoring terminal that is operably provided for monitoring a potential (intermediate potential) at a position between adjacent secondary battery cells, among the secondary battery cells coupled in series. In this example, the terminal VBM is coupled at a node between the positive electrode 201b of the secondary battery cell 201 and the negative electrode 202a of the secondary battery cell 202, where the node is coupled to the terminal VBM, via a resistor R2 and a terminal BM. A CR filter is constituted by the resistor R2 and a capacitor C2.

The terminal CO is an example of a charge control terminal for outputting a signal to prohibit the secondary battery cells 201 and 202 to be charged. The terminal CO is coupled to a control electrode (e.g., in a case of a MOSFET, a gate) of the charge control transistor 11.

The terminal DO is an example of a discharge control terminal for outputting a signal to prohibit the secondary battery cells 201 and 202 to be discharged. The terminal DO is coupled to a control electrode (e.g., in a case of a MOSFET, a gate) of the discharge control transistor 12.

The terminal VM is an example of a monitoring terminal that monitors a potential at the terminal P−. The terminal VM is coupled at a node in the power path 7 between the terminal P− and the switching circuit 13. The terminal VM is coupled to the terminal P− via the resistor R3.

As in the terminal BSL, the terminal BS1 is an example of a first monitoring terminal. The terminal BS1 is provided in a path different from the power paths 7 and 8. The terminal BS1 is operable for monitoring a potential at the negative electrode 201a of the secondary battery cell 201. In this example, the terminal BS1 is coupled to the terminal BSL via the resistor R5. The magnitude of the current to flow into a line path that includes the terminal BS1 and the terminal BSL can be adjusted by a resistance value of the resistor R5.

As in the terminal BSM, the terminal BS2 is an example of a second monitoring terminal. The terminal BS2 is provided in a path different from the power paths 7 and 8. The terminal BS2 is operable for monitoring a potential at the negative electrode 202a of the secondary battery cell 202. The terminal BS2 is coupled to the terminal BSM via the resistor R4. The magnitude of the current to flow into a line path that includes the terminal BS2 and the terminal BSM can be adjusted by a resistance value of the resistor R4.

The protection IC 120 includes a discharge control circuit 81, a charge control circuit 82, a switch control circuit 83. The protection IC 120 also includes internal lines 85 and 86, internal switches 21, 22, 23, 24, and 43, and internal resistors 51 and 52.

The discharge control circuit 81 includes an anomaly detecting circuit that detects an anomaly of discharging of the secondary battery cells 201 and 202. The discharge control circuit 81 is an example of a control circuit that controls the switching circuit 13 when the anomaly detecting circuit detects an anomaly of discharging of the secondary battery cells 201 and 202, where controlling of the switching circuit 13 is based on a detected result by the anomaly detecting circuit. The charge control circuit 82 includes an anomaly detecting circuit that detects an anomaly of charging of the secondary battery cells 201 and 202. The charge control circuit 82 is an example of a control circuit that controls the switching circuit 13 when the anomaly detecting circuit detects an anomaly of charging of the secondary battery cells 201 and 202, where controlling of the switching circuit 13 is based on a detected result by the anomaly detecting circuit.

The charge control circuit 82 includes an overcharge detecting circuit (which is an example of an anomaly detecting circuit) that detects overcharge (which is an example of a predetermined anomaly) of the secondary battery cells 201 and 202. The overcharge detecting circuit monitors a power supply voltage VD between the terminal VDD and the terminal VSS. The overcharge detecting circuit may monitor each of respective cell voltages for the secondary battery cell 201 and the secondary battery cell 202. For example, the overcharge detecting circuit monitors, as a cell voltage VC1 for the secondary battery cell 202, a voltage between the terminal VBM and the terminal VSS, while monitoring, as a cell voltage VC2 for the secondary battery cell 202, a voltage between the terminal VDD and the terminal VBM. When the overcharge detecting circuit detects that at least one of the cell voltage VC1 and the cell voltage VC2 is higher than or equal to a threshold Vdet1 at which overcharge is detected, the charge control circuit 82 outputs, from the terminal CO, a charge control signal to turn the charge control transistor 11 off (protective action against overcharging). By turning the charge control transistor 11 off, the current to flow in the charging direction of the secondary battery cells 201 and 202 is cut off. Thus, overcharging of the secondary battery cells 201 and 202 can be prevented.

The discharge control circuit 81 includes an overdischarge detecting circuit (which is an example of an anomaly detecting circuit) that detects overdischarge (which is an example of a predetermined anomaly) of the secondary battery cells 201 and 202. The overdischarge detecting circuit monitors a power supply voltage VD between the terminal VDD and the terminal VSS. The overdischarge detecting circuit may monitor each of respective cell voltages for the secondary battery cell 201 and the secondary battery cell 202. For example, the overdischarge detecting circuit monitors, as the cell voltage VC1 for the secondary battery cell 201, a voltage between the terminal VBM and the terminal VSS, and monitors, as the cell voltage VC2 for the secondary battery cell 202, a voltage between the terminal VDD and the terminal VBM. When the overdischarge detecting circuit detects that at least one of the cell voltage VC1 and the cell voltage VC2 is lower than or equal to a threshold Vdet2 at which overdischarge is detected, the discharge control circuit 81 outputs, from the terminal DO, a charge control signal to turn the discharge control transistor 12 off (protective action against overdischarging). By turning the discharge control transistor 12 off, the current flowing in a discharging direction of the secondary battery cells 201 and 202 is cut off. Thus, overdischarge in the secondary battery cells 201 and 202 can be prevented.

The discharge control circuit 81 includes a discharge-overcurrent detecting circuit (which is an example of an anomaly detecting circuit) that detects discharge-overcurrent (which is an example of a predetermined anomaly) through the secondary battery cells 201 and 202. The discharge-overcurrent detecting circuit monitors a current detection voltage VI between the terminal VM and the terminal VSS. When the discharge-overcurrent detecting circuit detects that the current detection voltage VI is higher than or equal to a predetermined threshold Vdet3 at which discharge-overcurrent is detected, the discharge control circuit 81 outputs, from the terminal DO, a discharge control signal to turn the discharge control transistor 12 off (protective action against discharge-overcurrent). By turning the discharge control transistor 12 off, the current flowing in the discharging direction of the secondary battery cells 201 and 202 is cut off. Thus, overcurrent can be prevented from flowing in the discharging direction of the secondary battery cells 201 and 202.

The charge control circuit 82 includes a charge-overcurrent detecting circuit (which is an example of an anomaly detecting circuit) that detects charge-overcurrent (which an example of a predetermined anomaly) through the secondary battery cells 201 and 202. The charge-overcurrent detecting circuit monitors a current detection voltage VI between the terminal VM and the terminal VSS. When the charge-overcurrent detecting circuit detects that the current detection voltage VI is lower than or equal to a predetermined threshold Vdet4 at which charge-overcurrent is detected, the charge control circuit 82 outputs, from the terminal CO, a charge control signal to turn the charge control transistor 11 off (protective action against charge-overcurrent). By turning the charge control transistor 11 off, the current flowing in a charging direction of the secondary battery cells 201 and 202 is cut off. Thus, overcurrent can be prevented from flowing in the charging direction of the secondary battery cells 201 and 202.

The internal line 85 is a current path that is partially provided between the negative electrode 201a and the terminal BSL. More specifically, the internal line 85 is the current path provided between the terminal VSS and the terminal BS1. The internal line 86 is a current path that is partially provided between the negative electrode 202a and the terminal BSM. More specifically, the internal line 86 is the current path provided between the terminal VBM and the terminal BS2.

The switch control circuit 83 is a circuit that turns each of the internal switches 21, 22, 23, 24, and 43 on or off, in accordance with a result of anomaly detection by a given anomaly detecting circuit, as described above.

The internal switch 21 is inserted in the internal line 85. The internal switch 22 is provided to enable the terminal BS1 and the terminal VM to be short-circuited. The internal switch 23 is inserted in the internal line 86. The internal switch 24 is provided to enable the terminal BS2 and the terminal VM to be short-circuited. The internal switch 43 is provided to ensure an appropriate state selected from among (i) the terminal VM is coupled to the terminal VSS via the internal resistor 51, (ii) the terminal VM is coupled to the terminal VDD via the internal resistor 52, and (iii) neither the state (i) nor (ii) is selected. The switch control circuit 83 turns each of the internal switches 21, 22, 23, 24, and 43 on or off, in accordance with the result of anomaly detection by a given anomaly detecting circuit, as described above.

The external device 140 includes a balance control circuit 33. The balance control circuit 33 adjusts the current flowing into a line path that includes at least one of the internal lines 85 and 86, based on potentials at the respective terminals BSL and BSM. Based on the adjusting of the current, the balance control circuit 33 also controls balance between cell voltages for the secondary battery cells 201 and 202. In this example, the external device 140 includes a current control circuit 30 that adjusts the current flowing into a given line path that includes at least one of the internal lines 85 and 86. The balance control circuit 33 controls the current control circuit 30 to thereby control the balance between the cell voltages for the secondary battery cells 201 and 202.

The current control circuit 30 includes, for example, multiple current sources 31 and 32, where paths that include the respective current sources 31 and 32 are each coupled in parallel with a corresponding secondary battery cell among the secondary battery cells 201 and 202. The balance control circuit 33 controls the current control circuit 30 such that a constant current from either the current source 31 or the current source 32 flows into a given line path that includes a corresponding internal line among the internal lines 85 and 86. By such a control, the balance control circuit 33 controls the balance between the cell voltages for the secondary battery cells 201 and 202.

For example, the current source 32 is a constant current source, where a path that includes the constant current source is coupled in parallel with the secondary battery cell 201. By passing a constant current generated by the current source 32 into a line path DR1 (see FIG. 1) that includes the internal line 86 and the power path 7, the balance control circuit 33 adjusts an amount of discharge occurring in the secondary battery cell 201. Thus, even if a resistance value of the resistor R4 in the battery pack 151 changes over time, due to a design change, or the like, the external device 140 can causes a given discharge current corresponding to an appropriate amount of discharge, to flow into the line path DR1 that includes the secondary battery cell 201, the internal line 86, and the power path 7.

For example, the current source 31 is a constant current source, where a path that includes the constant current source is coupled in parallel with the secondary battery cell 202. By passing a constant current generated by the current source 31 into a line path DR2 (see FIG. 2) that includes the internal line 86 and the power path 8, the balance control circuit 33 controls an amount of discharge occurring in the secondary battery cell 202. Thus, even if a resistance value of the resistor R4 in the battery pack 151 changes over time, due to a design change, or the like, the external device 140 can cause a given discharge current corresponding to an appropriate amount of discharge, to flow into the line path DR2 that includes the secondary battery cell 202, the internal line 86, and the power path 8.

The current control circuit 30 includes a switching circuit that includes multiple switches 25 and 26. For example, paths that include the respective switches 25 and 26 are each coupled in parallel with a corresponding secondary battery cell among the secondary battery cells 201 and 202. The balance control circuit 33 controls the above switching circuit to thereby control the balance between the cell voltages for the secondary battery cells 201 and 202. The switching circuit switches between conduction and interruption of a given line path that includes one of the internal lines 85 and 86.

A given path that includes the switch 26 is coupled in parallel with the secondary battery cell 201, and the switch 26 is coupled in series with the current source 32. In response to a switching signal from the balance control circuit 33, the switch 26 switches between conduction and interruption of the line path DR1 (see FIG. 1) that includes the internal line 86 and the power path 7. In such a manner, the external device 140 can appropriately adjust the magnitude of a discharge current to flow into the line path DR1 including the internal line 86 and the power path 7.

A given path that includes the switch 25 is coupled in parallel with the secondary battery cell 202, and the switch 25 is coupled in series with the current source 31. In response to a switching signal from the balance control circuit 33, the switch 25 switches between conduction and interruption of the line path DR2 (see FIG. 2) that includes the internal line 86 and the power path 8. In such a manner, the external device 140 can appropriately adjust the magnitude of a discharge current to flow into the line path DR2 including the internal line 86 and the power path 8.

FIG. 16 is a diagram illustrating an example of switching control and connection conditions of terminals, with respect to each state of the secondary battery protection circuit. An example of the operation of the control system is described below with reference to FIG. 16.

When both overcharge in the secondary battery cells 201 and 202 and charge-overcurrent through the secondary battery cells 201 and 202 are not detected, the charge control circuit 82 turns the charge control transistor 11 on. In contrast, when at least one of (i) overcharge in the secondary battery cells 201 and 202 and (ii) charge-overcurrent through the secondary battery cells 201 and 202 is detected, the charge control circuit 82 turns the charge control transistor 11 off.

When overcharge in the secondary battery cells 201 and 202 and charge-overcurrent through the secondary battery cells 201 and 202 are not detected, the discharge control circuit 81 turns the discharge control transistor 12 on. In contrast, when at least one of (i) overcharge in the secondary battery cells 201 and 202 and (ii) charge-overcurrent through the secondary battery cells 201 and 202 is detected, the discharge control circuit 81 turns the discharge control transistor 12 off.

Figure 2:
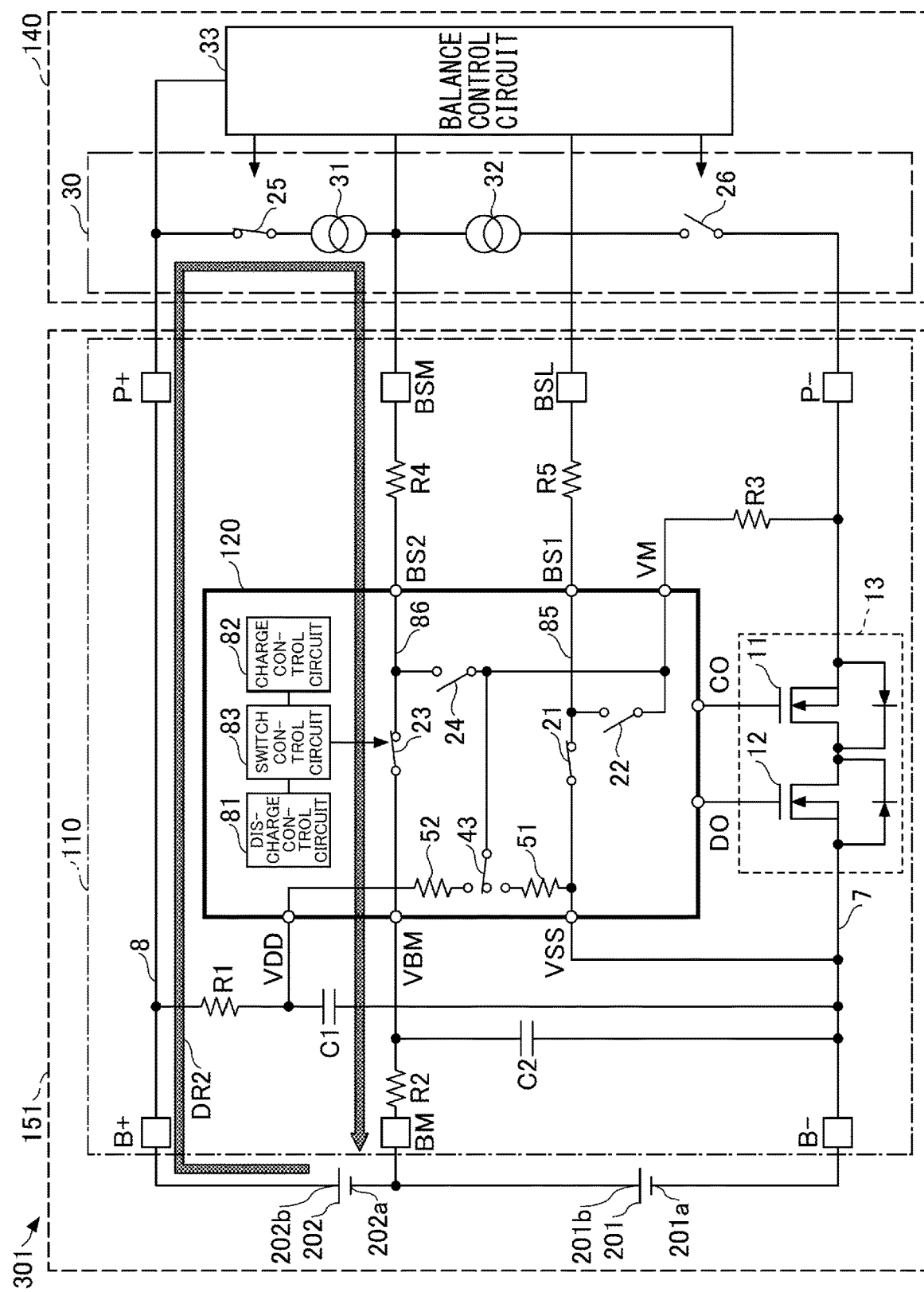
FIG. 2 is a diagram illustrating an example of the configuration of the control system according to the first embodiment, including a second discharge path used under the normal condition in which the anomaly of the plurality of secondary battery cells is not detected.

In FIGS. 1 and 2, a normal condition in which an anomaly of the secondary battery cells 201 and 202 is not detected is illustrated. When (i) overcharge, (ii) overdischarge, (iii) discharge-overcurrent, and (iv) charge-overcurrent are not detected for the secondary battery cells 201 and 202 (i.e., the secondary battery cells 201 and 202 are in a normal condition), the switch control circuit 83 turns the internal switch 21 on, turns the internal switch 22 off, and turns the internal switch 23 on. Also, the switch control circuit 83 turns the internal switch 24 off, and turns the internal switch 43 off. Thus, a potential at the terminal BSL becomes substantially the same potential as that at each of the terminal B−, the terminal VSS, and the negative electrode 201a. Further, a potential at the terminal BSM becomes substantially the same potential as that at each of the terminal BM, the terminal VBM, and the negative electrode 202a.

Therefore, in the normal condition illustrated in FIGS. 1 and 2, by monitoring a potential difference between the terminal BSM and the terminal P−, the balance control circuit 33 can measure the cell voltage for the secondary battery cell 201, with high accuracy. Further, in the normal condition illustrated in FIGS. 1 and 2, by monitoring a potential difference between the terminal BSL and the terminal P+, the balance control circuit 33 can measure the cell voltage for the secondary battery cell 202, with high accuracy. Moreover, in the normal condition illustrated in FIGS. 1 and 2, by monitoring a potential difference between the terminal BSM and the terminal P+, the balance control circuit 33 can highly accurately measure a cell voltage (total cell voltage VC) obtained by adding respective cell voltages for the secondary battery cells 201 and 202.

Under the normal condition in FIG. 1, a case where the cell voltage for the secondary battery cell 201 is higher than the cell voltage for the secondary battery cell 202 is illustrated. When determining that the cell voltage for the secondary battery cell 201 is higher than the cell voltage for the secondary battery cell 202, the balance control circuit 33 switches the switch 26 from off to on, in order to reduce the cell voltage for the secondary battery cell 201. Thus, the balance control circuit 33 causes the line path DR1 to enable discharging of the secondary battery cell 201.

Under the normal condition in FIG. 2, a case where the cell voltage for the secondary battery cell 202 is higher than the cell voltage for the secondary battery cell 201 is illustrated. When determining that the cell voltage for the secondary battery cell 202 is higher than the cell voltage for the secondary battery cell 201, the balance control circuit 33 switches the switch 25 from off to on, in order to reduce the cell voltage for the secondary battery cell 202. Thus, the balance control circuit 33 causes the line path DR2 to enable discharging of the secondary battery cell 202.

If a difference between the cell voltage for the secondary battery cell 201 and the cell voltage for the secondary battery cell 202 is less than or equal to a predetermined threshold, the balance control circuit 33 turns off both the switch 25 and the switch 26, to thereby interrupt discharging of the secondary battery cells 201 and 202 in cell balance control.

Figure 3:
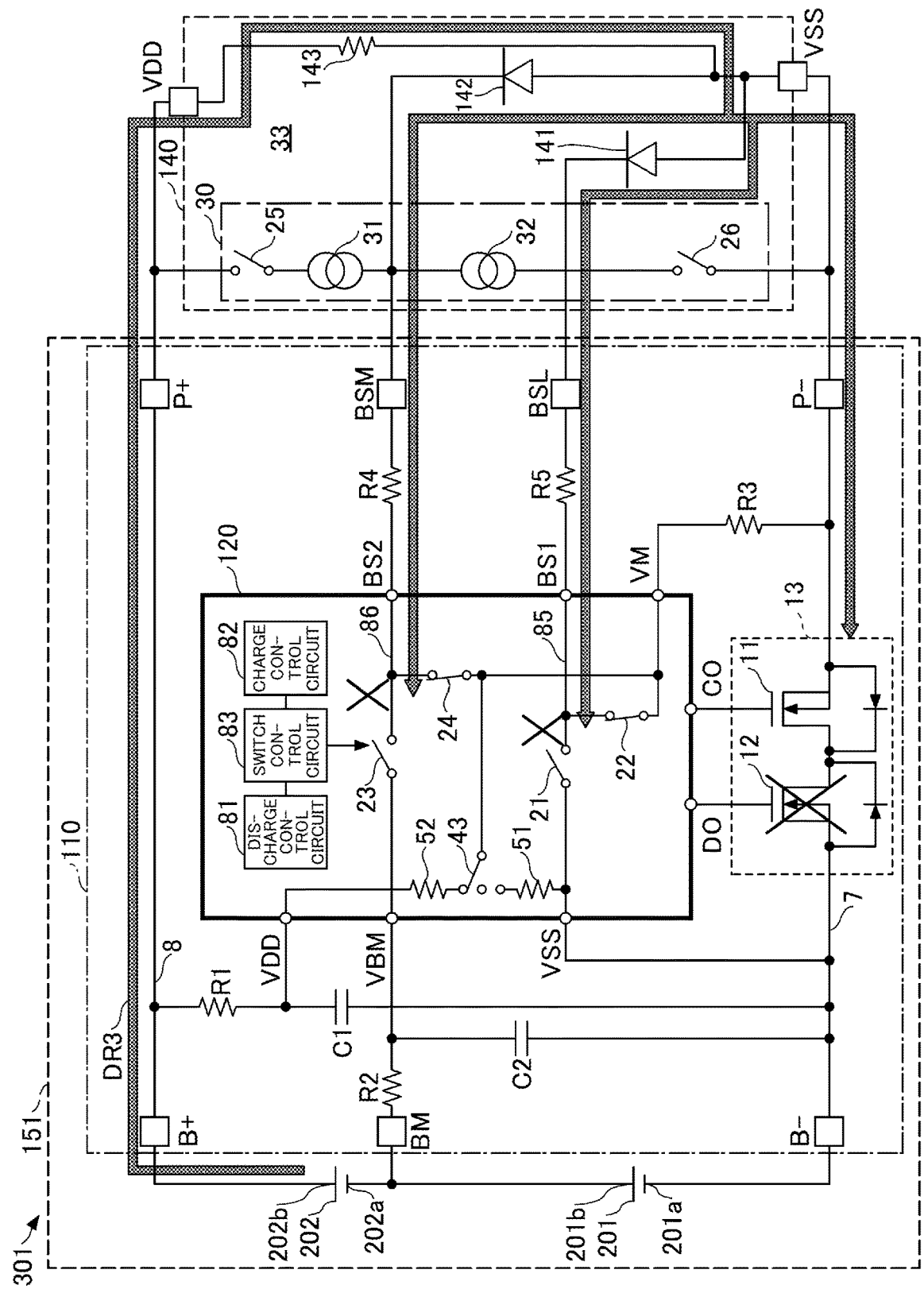
FIG. 3 is a diagram illustrating an example of the configuration of the control system according to the first embodiment, including a discharge path used under a condition in which overdischarge occurring in at least one secondary battery cell among the plurality of secondary battery cells is detected.

FIG. 3 is a diagram illustrating an example of the configuration of the control system according to a first embodiment. FIG. 3 illustrates a discharge path under a condition in which overdischarge occurring in at least one of the multiple secondary battery cells is detected. Under the condition in which overdischarge in at least one of the secondary battery cells 201 and 202 is detected, the switch control circuit 83 turns the internal switch 21 off, turns the internal switch 22 on, and turns the internal switch 23 off. Also, the switch control circuit 83 turns the internal switch 24 on, and causes the internal switch 43 to become coupled to the resistor 52. Thus, the terminal BSL (terminal BS1) and the terminal BSM (terminal BS2) are each coupled to the terminal P− (terminal VM), and thus the terminal P− is coupled to the terminal VDD. Accordingly, under the condition in which overdischarge is detected, a leak current path D3, along which a leak current flows from the power path 8 into each of the terminals BS1 and BS2, can be interrupted, where the leak current path D3 includes the power path 8, the power supply terminal VDD, a resistor 143, parasitic diodes 141 and 142 in the external device 140, and the terminals BS1 and BS2. As a result, progression of the discharge in the secondary battery cells 201 and 202 can be suppressed.

Figure 4:
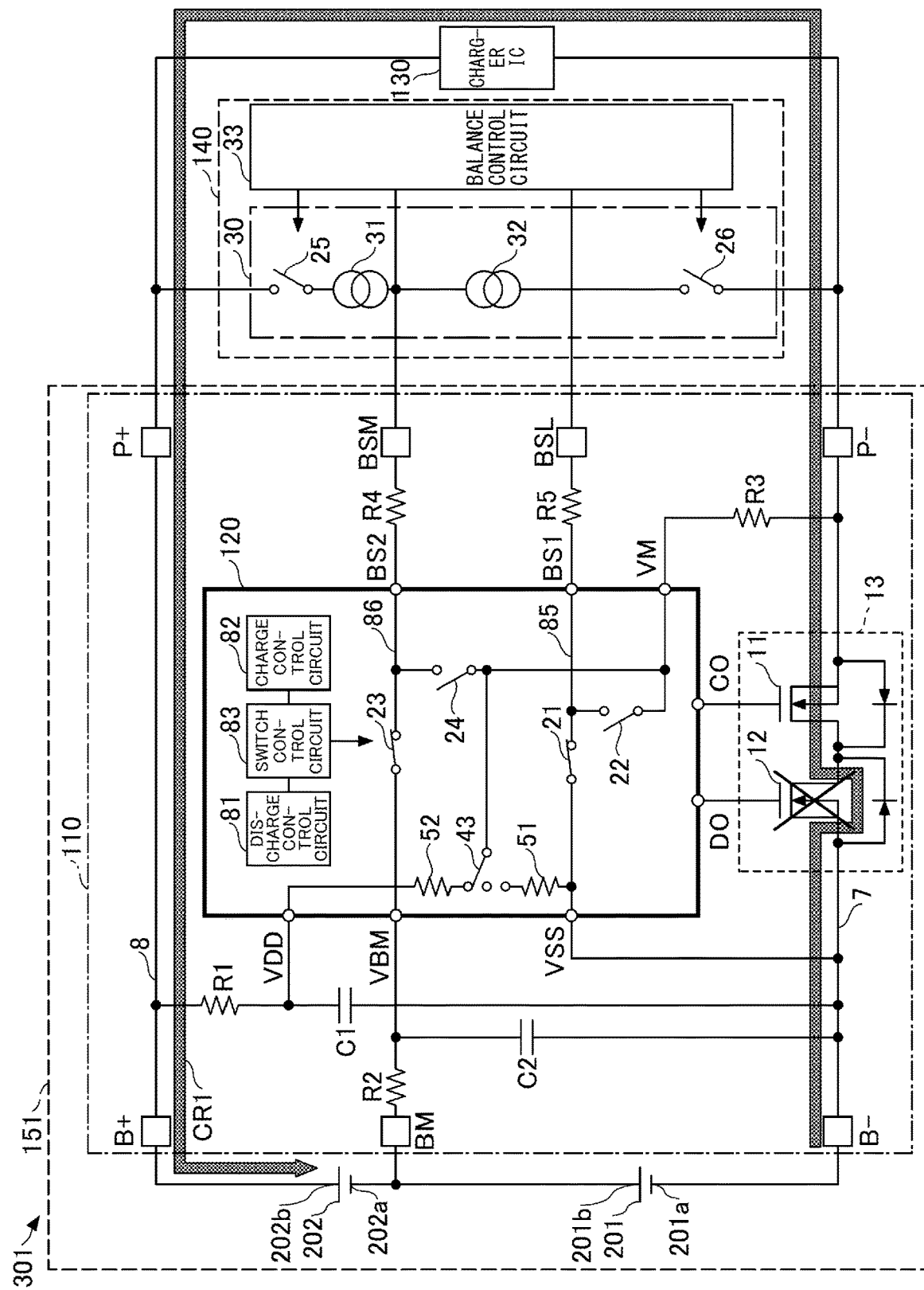
FIG. 4 is a diagram illustrating an example of the configuration of the control system according to the first embodiment, including a charge path used under a condition in which overdischarge occurring in at least one secondary battery cell among the plurality of secondary battery cells is detected, in conjunction with a condition in which a charger is coupled to a battery pack.

FIG. 4 is a diagram illustrating an example of the configuration of the control system according to the first embodiment. FIG. 4 illustrates a charge path under the condition in which overdischarge occurring in at least one of the multiple secondary battery cells is detected, in conjunction with a condition in which the charger is coupled to the battery pack. Under the condition in which overdischarge in at least one of the secondary battery cells 201 and 202 is detected, when the charger 130 is coupled to the battery pack 151, the switch control circuit 83 turns the internal switch 21 on, turns the internal switch 22 off, and turns the internal switch 23 on. Also, the switch control circuit 83 turns the internal switch 24 off, and causes the internal switch 43 to become coupled to the resistor 52. Thus, under the condition in which the overdischarge is detected, the terminal BSL (terminal BS1) becomes coupled to the terminal P− (terminal VSS), the terminal BSM (terminal BS2) becomes coupled to the terminal BM (terminal VBM), and the terminal P− becomes coupled to the terminal VDD. Accordingly, under the detected condition of the overdischarge, when the charger 130 is coupled to the battery pack 151, the line path CR1 from the charger 130 to the secondary battery cells 202 and 201 enables charging of the secondary battery cells 201 and 202. Further, without being influenced by forward voltages across the parasitic diodes 141 and 142 (see FIG. 3), the external device 140 can measure each of the cell voltages for the secondary battery cells 201 and 202, with high accuracy. Accordingly, pre-charging and rapid charging can be prevented from being unnecessarily repeated.

Figure 5:
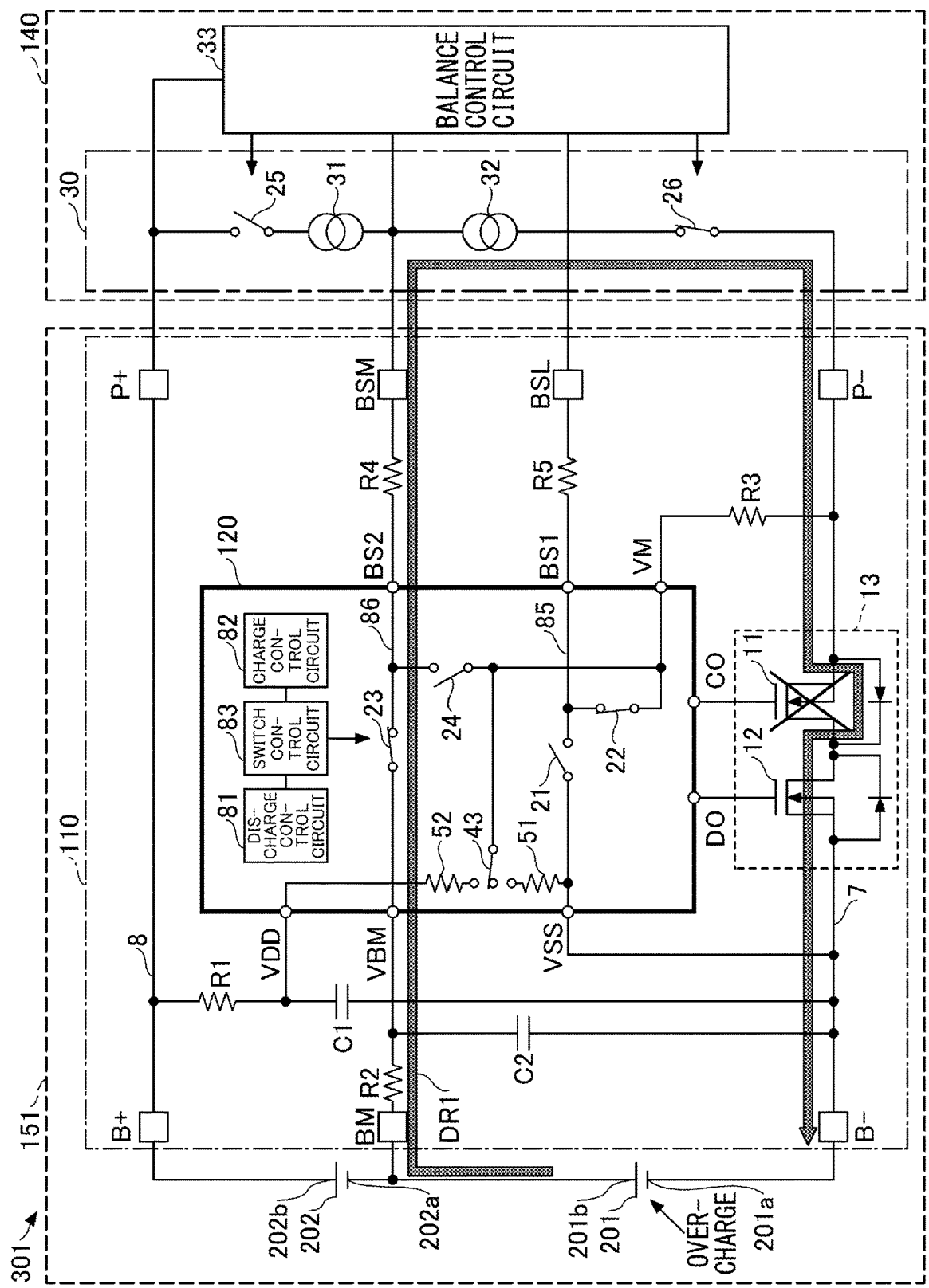
FIG. 5 is a diagram illustrating an example of the configuration of the control system according to the first embodiment, including a discharge path used under a condition in which overcharge occurring in a low potential-side secondary battery cell among the plurality of secondary battery cells is detected.

FIG. 5 is a diagram illustrating an example of the configuration of the control system according to the first embodiment. FIG. 5 illustrates a discharge path under a condition in which overcharge occurring in a low potential-side secondary battery cell among the multiple secondary battery cells is detected. Under the condition in which overcharge in the low potential-side secondary battery cell 201 among the secondary battery cells 201 and 202 is detected, the switch control circuit 83 turns the internal switch 21 off, turns the internal switch 22 on, and turns the internal switch 23 on. Also, the switch control circuit 83 turns the internal switch 24 off, and turns the internal switch 43 off. Thus, the terminal BSL (terminal BS1) becomes coupled to the terminal P− (terminal VM), the terminal BSM (terminal BS2) becomes coupled to the terminal BM (terminal VBM), and the terminal P− has high impedance (Hi-Z). When determining that the cell voltage for the secondary battery cell 201 is higher than the cell voltage for the secondary battery cell 202, the balance control circuit 33 switches the switch 26 from off to on, in order to reduce the cell voltage for the secondary battery cell 201. Thus, the line path DR1 enables discharging of the secondary battery cell 201. Accordingly, even when overcharging is detected, the secondary battery cell 201 can be discharged by the cell balance control.

Figure 6:
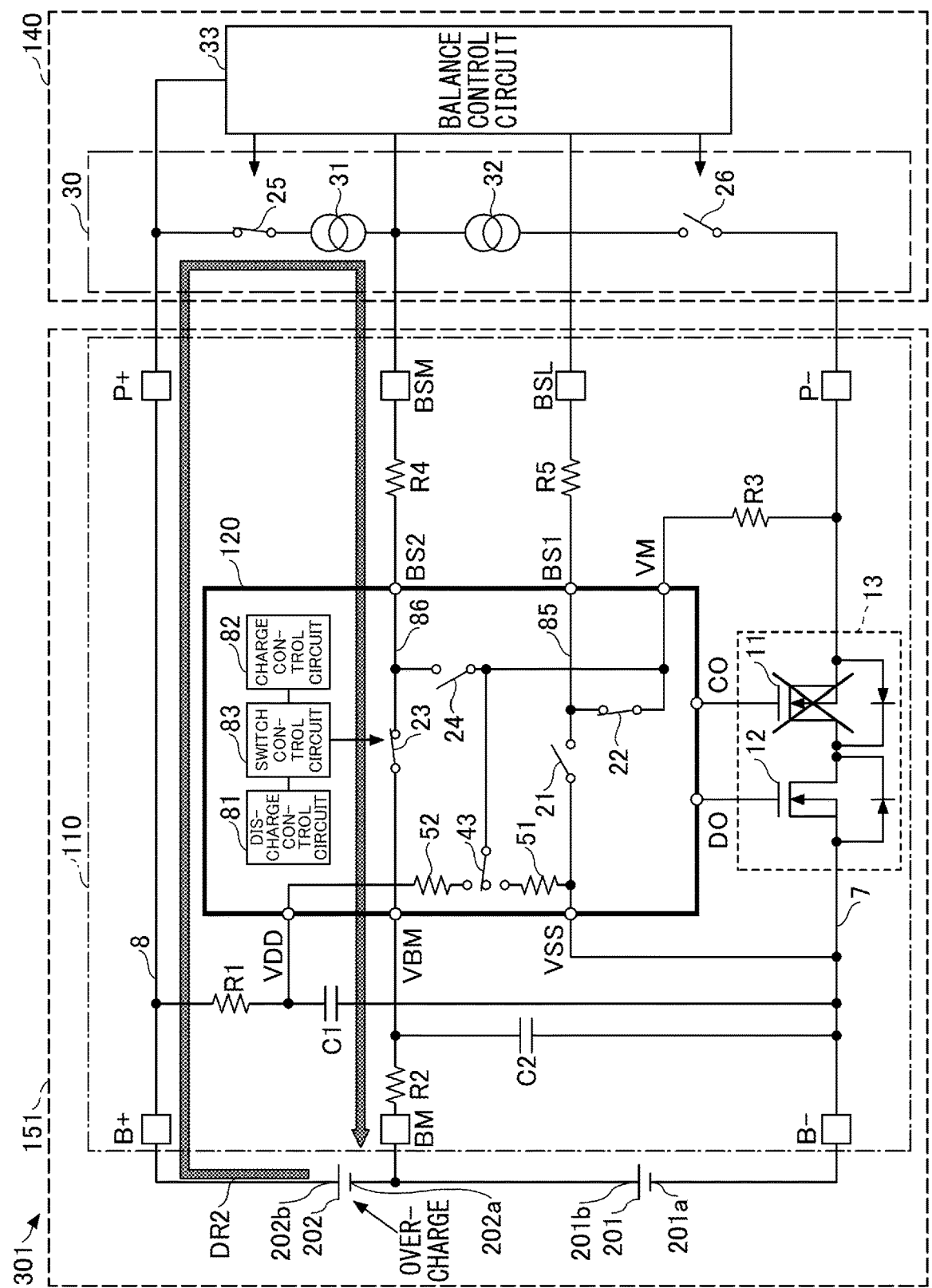
FIG. 6 is a diagram illustrating an example of the configuration of the control system according to the first embodiment, including a discharge path used under a condition in which overcharge occurring in a high potential-side secondary battery cell among the plurality of secondary battery cells is detected.

FIG. 6 is a diagram illustrating an example of the configuration of the control system according to the first embodiment. FIG. 6 illustrates a discharge path under a condition in which overcharge occurring in a high potential-side secondary battery cell among the multiple secondary battery cells is detected. Under the condition in which overcharge in the high potential-side secondary battery cell 202 among the secondary battery cells 201 and 202 is detected, the switch control circuit 83 turns the internal switch 21 off, turns the internal switch 22 on, and turns the internal switch 23 on. Also, the switch control circuit 83 turns the internal switch 24 off, and turns the internal switch 43 off. Thus, the terminal BSL (terminal BS1) becomes coupled to the terminal P− (terminal VM), the terminal BSM (terminal BS2) becomes coupled to the terminal BM (terminal VBM), and the terminal P− has high impedance (Hi-Z). When determining that the cell voltage for the secondary battery cell 202 is higher than the cell voltage for the secondary battery cell 201, the balance control circuit 33 switches the switch 25 from off to on, in order to reduce the cell voltage for the secondary battery cell 202. Thus, the line path DR2 enables discharging of the secondary battery cell 202. Accordingly, even when overcharging is detected, the secondary battery cell 202 can be discharged by the cell balance control.

A state of each switch used in other modes of detecting anomalies is as illustrated in FIG. 16. Note that in FIG. 16, in detection by the terminal BS1, an abnormal condition is detected by a given anomaly detecting circuit to detect overcurrent flowing into the internal line 85 that is coupled between the terminal BS1 and the terminal VSS. Also, in detection by the terminal BS2, an abnormal condition is detected by a given anomaly detecting circuit to detect overcurrent flowing into the internal line 86 that is coupled between the terminal BS2 and the terminal VBM.

<Second embodiment>

Figure 7:
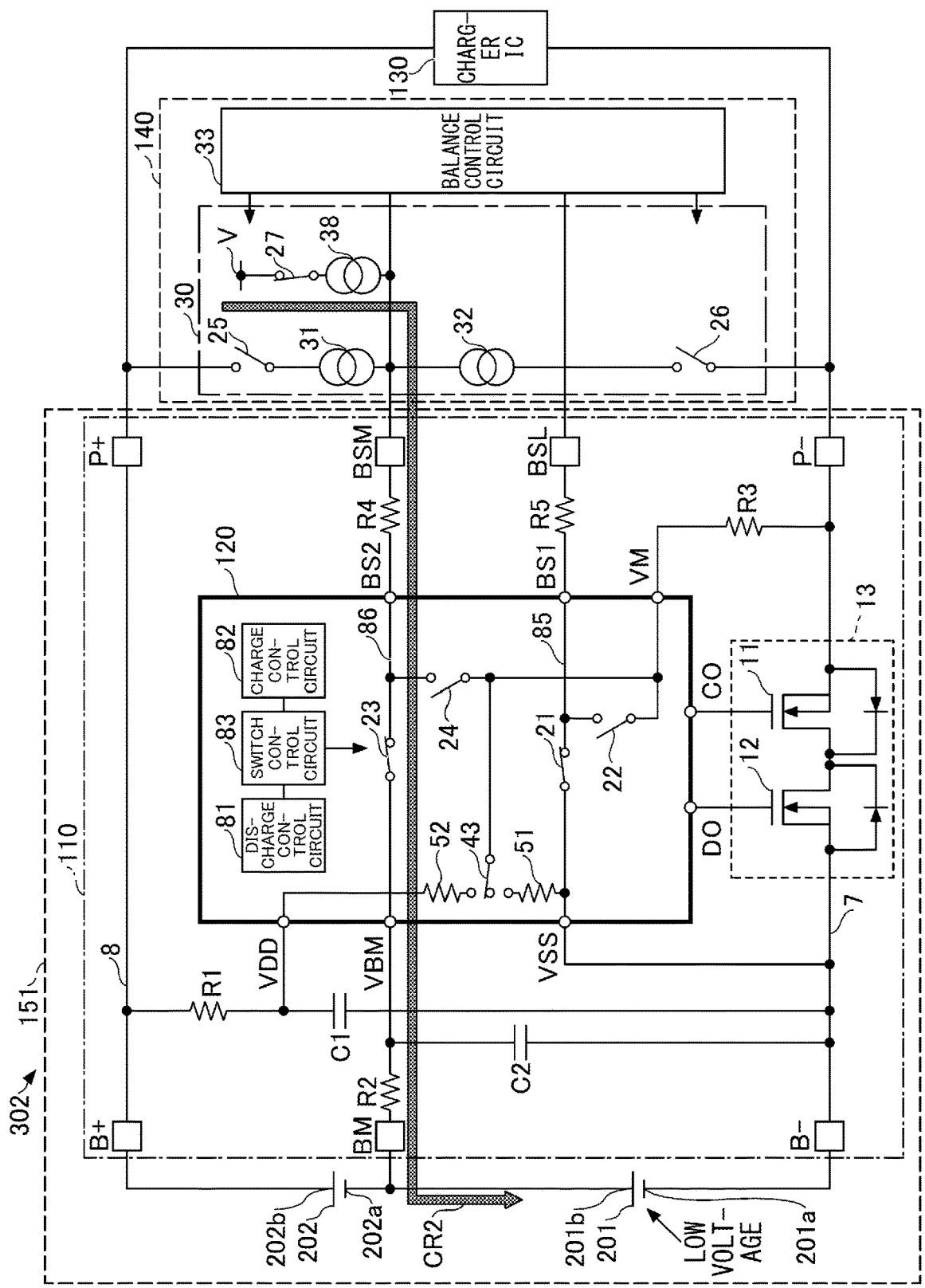
FIG. 7 is a diagram illustrating an example of the configuration of the control system according to a second embodiment, including a charge path that enables charging of a low potential-side secondary battery cell among the secondary battery cells, in a cell balance control.
Figure 8:
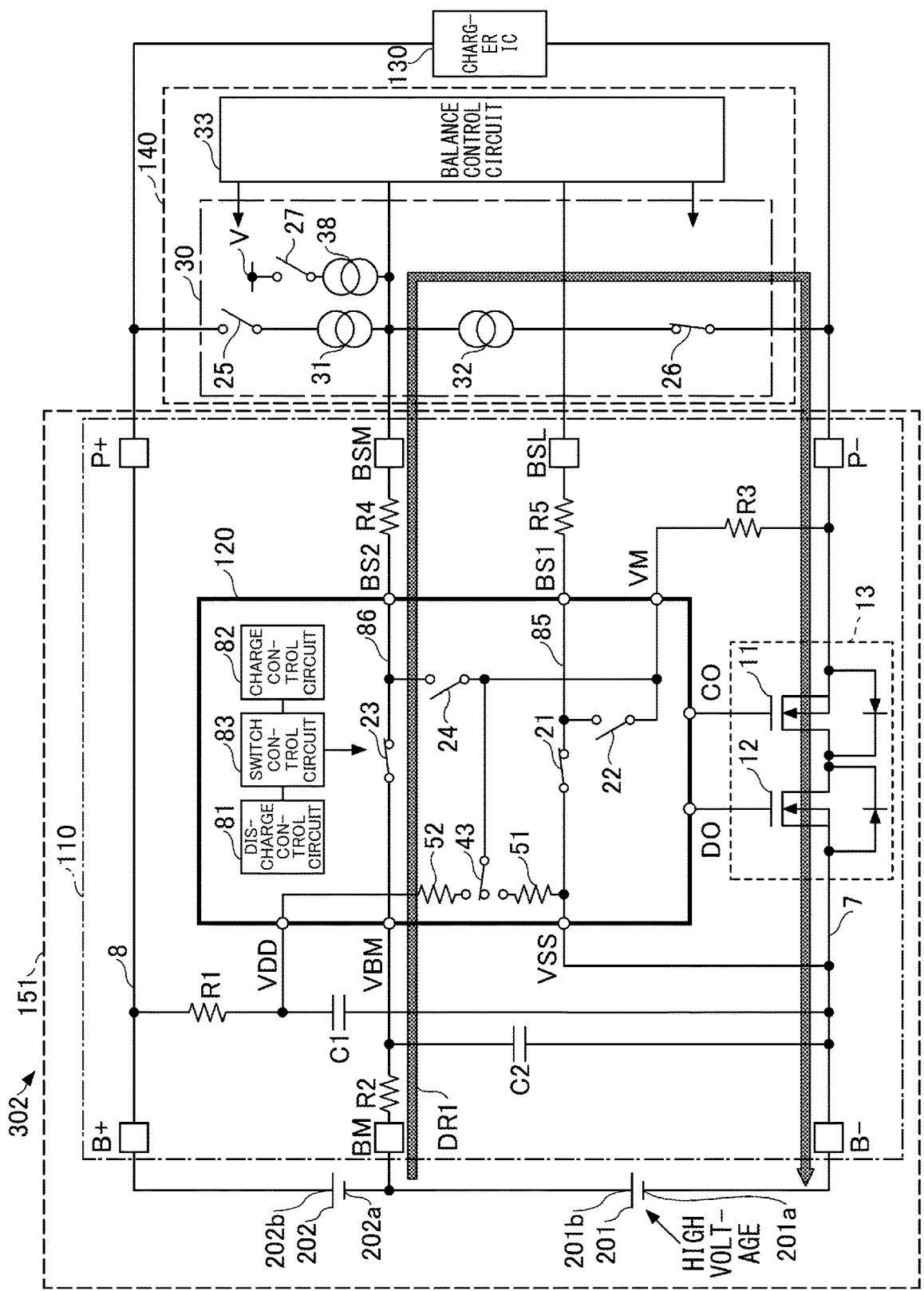
FIG. 8 is a diagram illustrating an example of the configuration of the control system according to the second embodiment, including a discharge path that enables discharging of the low potential-side secondary battery cell among the secondary battery cells, in the cell balance control.

FIG. 7 is a diagram illustrating an example of the configuration of the control system according to a second embodiment. FIG. 7 illustrates a charge path that enables charging of a low potential-side secondary battery cell among the multiple secondary battery cells, in the cell balance control. FIG. 8 is a diagram illustrating an example of the configuration of the control system according to the second embodiment. FIG. 8 illustrates a discharge path that enables discharging of the low potential-side secondary battery cell among the multiple secondary battery cells, in the cell balance control. In the second embodiment, description for the same configuration as that described in the above-described embodiment is omitted. Such description is incorporated herein by reference.

In a control system 302 illustrated in each of FIGS. 7 and 8, the external device 140 includes the current control circuit 30 that adjusts the current flowing into a line path that includes a given internal line among the internal lines 85 and 86. The current control circuit 30 includes a current source 38, which is coupled at a node in the internal line 86, and includes a switching circuit that includes a switch 27 coupled in series with the current source 38.

FIGS. 7 and 8 illustrate a normal condition in which an anomaly of the secondary battery cells 201 and 202 is not detected. Under the normal condition illustrated in FIG. 7, the balance control circuit 33 causes the secondary battery cell 201 to be charged with a charge current flowing into a line path CR2 (see FIG. 7). Also, under the normal condition illustrated in FIG. 8, the balance control circuit 33 causes the secondary battery cell 201 to be discharged with a discharge current flowing into a line path DR (see FIG. 8). Thus, the balance control circuit 33 adjusts the cell voltage for the secondary battery cell 201 to be close to the cell voltage for the secondary battery cell 202.

Under the normal condition illustrated in FIG. 7, a case where the cell voltage for the secondary battery cell 201 is lower than the cell voltage for the secondary battery cell 202 is illustrated. When determining that the cell voltage for the secondary battery cell 201 is lower than the cell voltage for the secondary battery cell 202, the balance control circuit 33 switches the switch 27 from off to on, in order to increase the cell voltage for the secondary battery cell 201. Thus, the line path CR2 enables charging of the secondary battery cell 201.

The secondary battery cell 201 is charged with the current output from the current source 38. For example, the current source 38 is a constant current source.

Under the normal condition illustrated in FIG. 8, a case where the cell voltage for the secondary battery cell 201 is higher than the cell voltage for the secondary battery cell 202 is illustrated. When determining that the cell voltage for the secondary battery cell 201 is higher than the cell voltage for the secondary battery cell 202, the balance control circuit 33 switches the switch 26 from off to on, in order to reduce the cell voltage for the secondary battery cell 201. Thus, the line path DR1 enables discharging of the secondary battery cell 201. The secondary battery cell 201 is discharged with the current output from the current source 32. For example, the current source 32 is a constant current source.

<Third embodiment>

Figure 9:
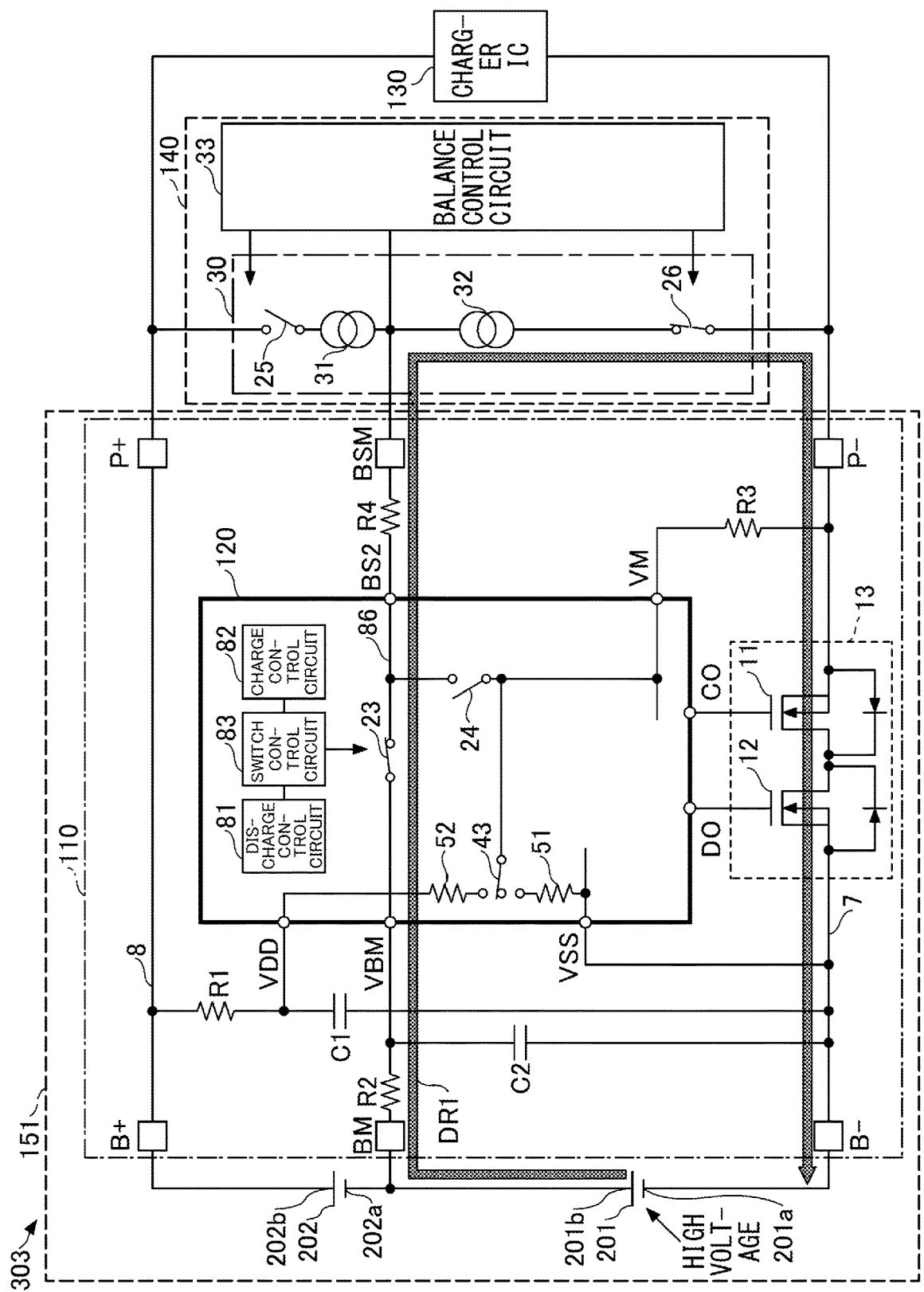
FIG. 9 is a diagram illustrating an example of the configuration of the control system according to a third embodiment, including a discharge path that enables discharging of the low potential-side secondary battery cell among the secondary battery cells, in the cell balance control.
Figure 10:
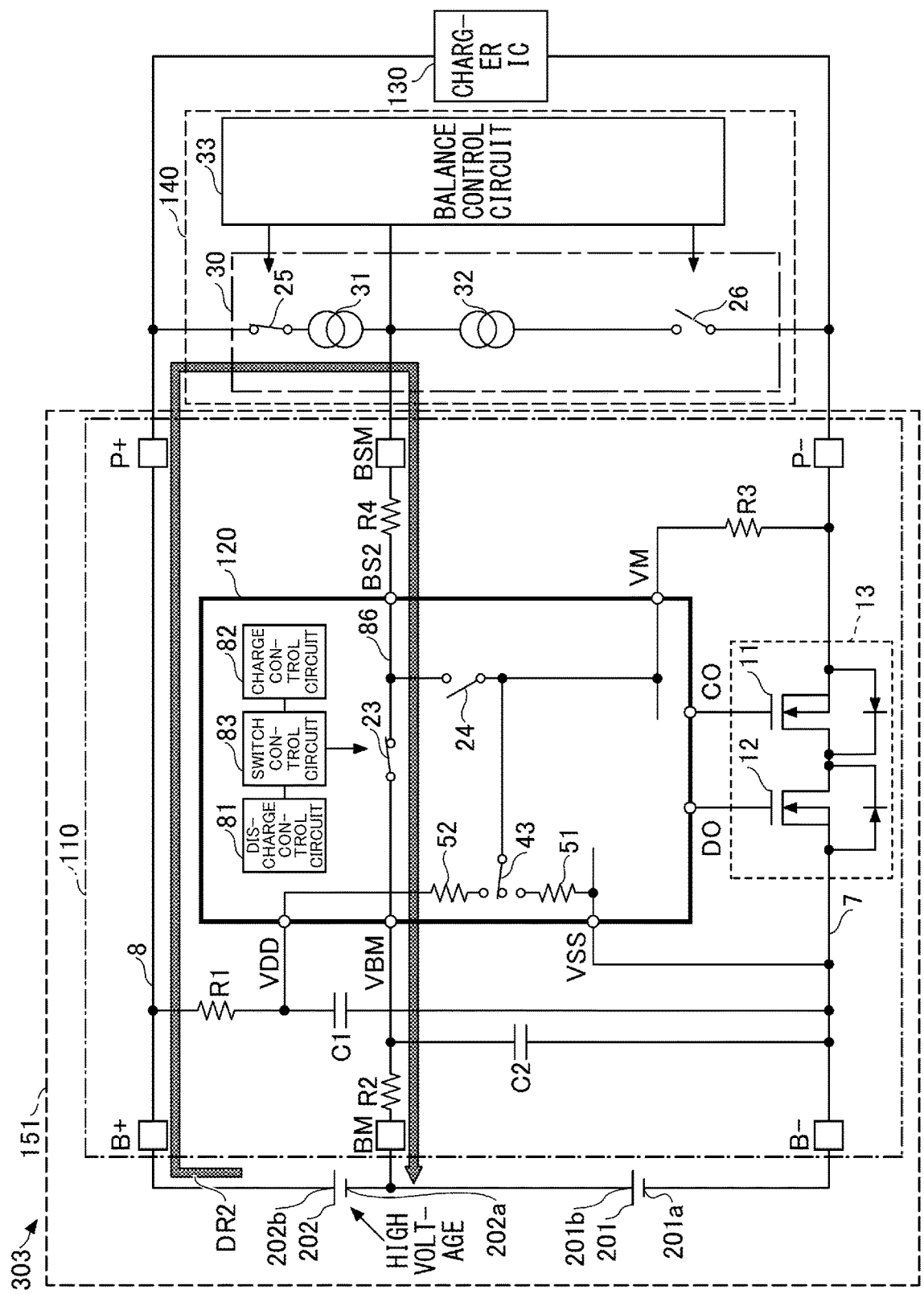
FIG. 10 is a diagram illustrating an example of the configuration of the control system according to the third embodiment, including a discharge path that enables discharging of a high potential-side secondary battery cell among the secondary battery cells, in the cell balance control.
Figure 11:
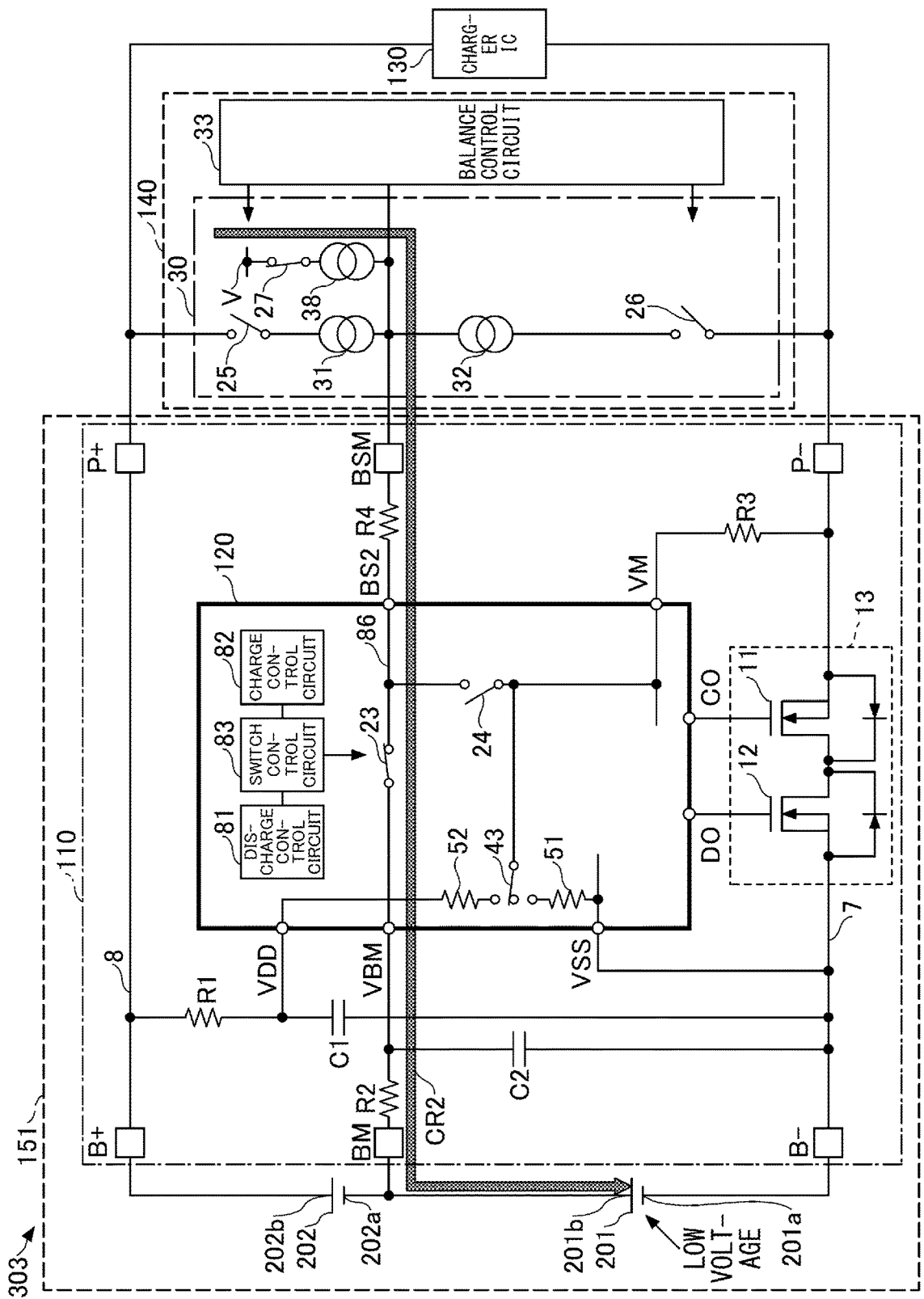
FIG. 11 is a diagram illustrating an example of the configuration of the control system according to the third embodiment, including a charge path that enables charging of the low potential-side secondary battery cell among the secondary battery cells, in the cell balance control.

FIG. 9 is a diagram illustrating an example of the configuration of the control system according to a third embodiment. FIG. 9 illustrates a given charge path that enables discharging of the low potential-side secondary battery cell among the multiple secondary battery cells, in the cell balance control. FIG. 10 is a diagram illustrating an example of the configuration of the control system according to the third embodiment. FIG. 10 illustrates a given discharge path that enables discharging of the high potential-side secondary battery cell among the multiple secondary battery cells, in the cell balance control. FIG. 11 is a diagram illustrating an example of the configuration of the control system according to the third embodiment. FIG. 11 illustrates a given charge path that enables charging of the low potential-side secondary battery cell among the multiple secondary battery cells, in the cell balance control. In the third embodiment, description for the same configuration as that described in the above-described embodiments is omitted. Such description is incorporated herein by reference.

In a control system 303 illustrated in FIGS. 9, 10, and 11, the protection IC 120 does not include terminals BS1 and BSL and an internal line 85. In each of FIGS. 9, 10, and 11, the normal condition in which the anomaly of the secondary battery cells 201, 202 is not detected is illustrated.

Under the normal condition illustrated in FIG. 9, a case where the cell voltage for the secondary battery cell 201 is higher than the cell voltage for the secondary battery cell 202 is illustrated. When determining that the cell voltage for the secondary battery cell 201 is higher than the cell voltage for the secondary battery cell 202, the balance control circuit 33 switches the switch 26 from off to on, in order to reduce the cell voltage for the secondary battery cell 201. Thus, the line path DR1 enables discharging of the secondary battery cell 201. The secondary battery cell 201 is discharged with the current output from the current source 32. For example, the current source 32 is a constant current source.

Under the normal condition illustrated in FIG. 10, a case where the cell voltage for the secondary battery cell 202 is higher than the cell voltage for the secondary battery cell 201 is illustrated. When determining that the cell voltage for the secondary battery cell 202 is higher than the cell voltage for the secondary battery cell 201, the balance control circuit 33 switches the switch 25 from off to on, in order to reduce the cell voltage for the secondary battery cell 202. Thus, the line path DR2 enables discharging of the secondary battery cell 202. The secondary battery cell 202 is discharged with the current output from the current source 31. For example, the current source 31 is a constant current source.

Under the normal condition illustrated in FIG. 11, a case where the cell voltage for the secondary battery cell 201 is lower than the cell voltage for the secondary battery cell 202 is illustrated. When determining that the cell voltage for the secondary battery cell 201 is lower than the cell voltage for the secondary battery cell 202, the balance control circuit 33 switches the switch 27 from off to on, in order to increase the cell voltage for the secondary battery cell 201. Thus, the line path CR2 enables charging of the secondary battery cell 201. The secondary battery cell 201 is charged with the current output from the current source 38. For example, the current source 38 is a constant current source.

<Fourth embodiment>

Figure 12:
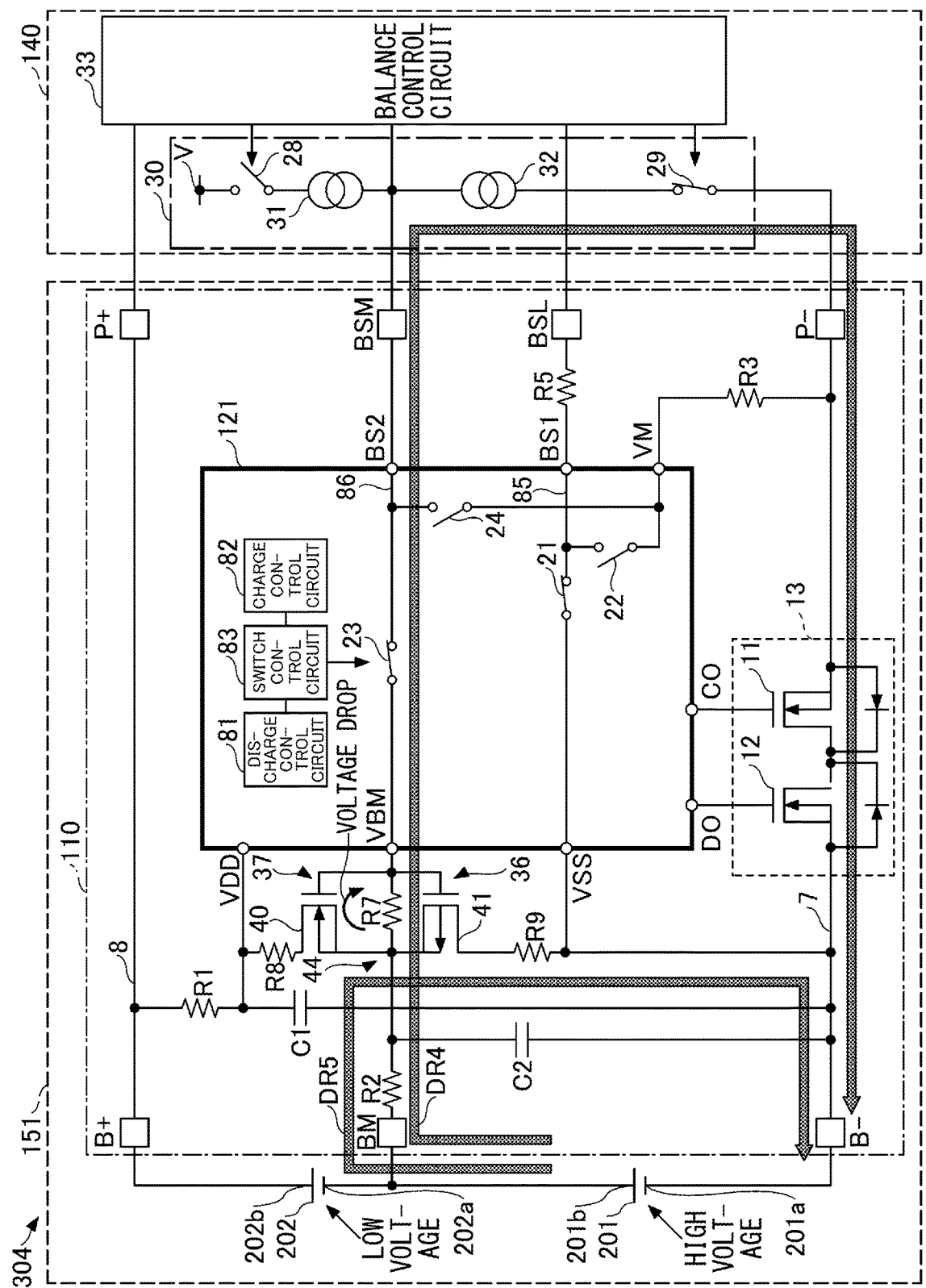
FIG. 12 is a diagram illustrating an example of the configuration of the control system according to a fourth embodiment, including a discharge path that enables discharging of the low potential-side secondary battery cell among the secondary battery cells, in the cell balance control.
Figure 13:
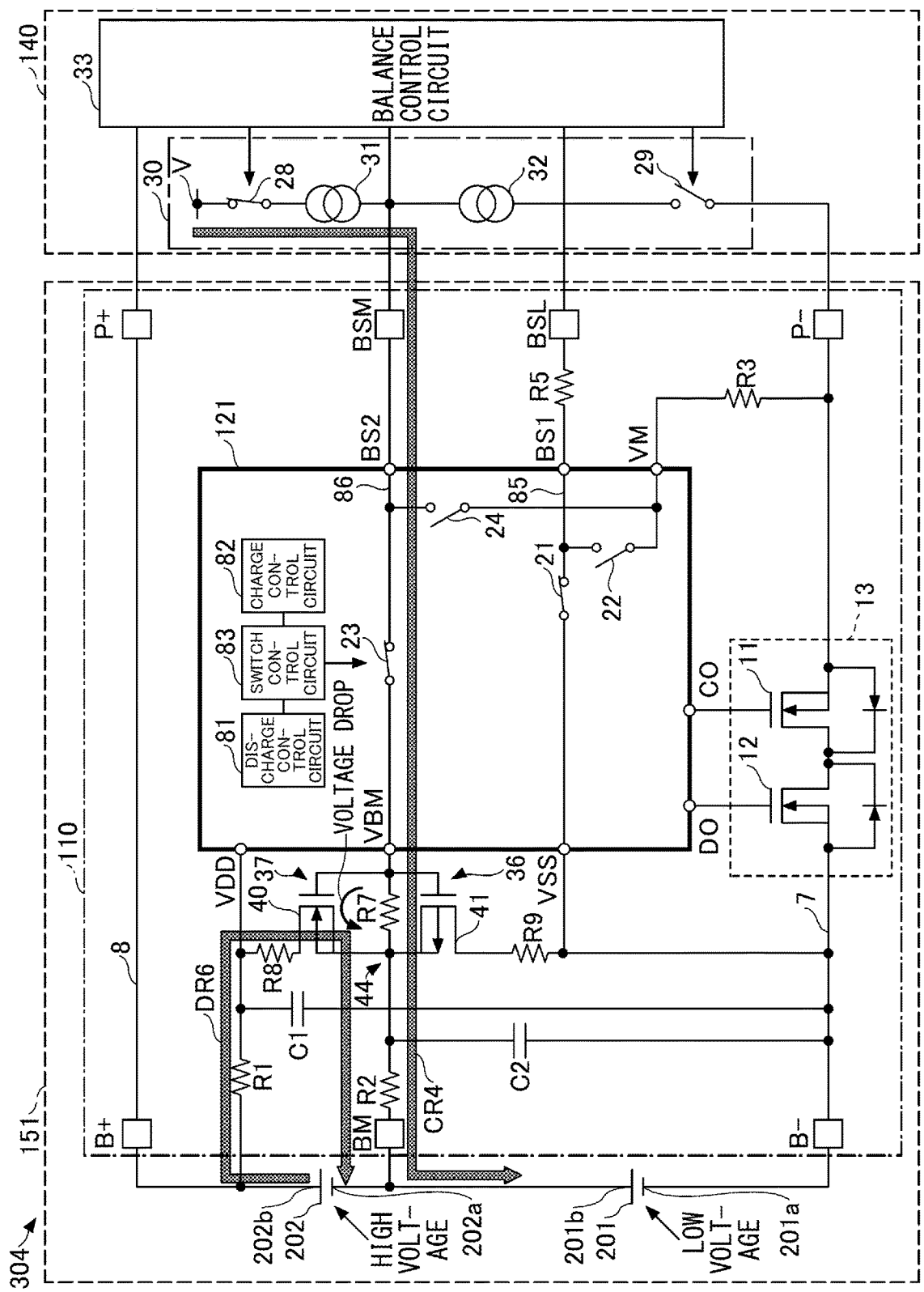
FIG. 13 is a diagram illustrating an example of the configuration of the control system according to the fourth embodiment, including a discharge path that enables discharging of the high potential-side secondary battery cell among the secondary battery cells, in the cell balance control, as well as including a charge path that enables charging of the low potential-side secondary battery cell.

FIG. 12 is a diagram illustrating an example of the configuration of the control system according to a fourth embodiment. FIG. 12 illustrates a given discharge path that enables discharging of the low potential-side secondary battery cell among the multiple secondary battery cells, in the cell balance control. FIG. 13 is a diagram illustrating an example of the configuration of the control system according to the fourth embodiment. FIG. 13 illustrates in the cell balance control, a given discharge path that enables discharging of the high potential-side secondary battery cell among the multiple secondary battery cells, as well as including a given charge path that enables charging of the low potential-side secondary battery cell. In the fourth embodiment, description for the same configuration as that described in the above-described embodiments is omitted. Such description is incorporated herein by reference. In each of the control systems 301 to 303 described in the above embodiments, in the cell balance control, a given discharge path into which a discharge current flows is partially provided in the external device 140. In contrast, as illustrated in each of FIGS. 12 and 13, in a control system 304 according to the fourth embodiment, in the cell balance control, a discharge path into which a discharge current (other than a control current described below) flows is entirely provided on the battery pack 151-side.

In a normal condition illustrated in FIG. 12, a case where the cell voltage for the secondary battery cell 201 is higher than the cell voltage for the secondary battery cell 202 is illustrated. When determining that the cell voltage for the secondary battery cell 201 is higher than the cell voltage for the secondary battery cell 202, the balance control circuit 33 switches a switch 29 from off to on, in order to reduce the cell voltage for the secondary battery cell 201. Thus, the control current is generated to flow from the positive electrode 201b to the negative electrode 201a of the secondary battery cell 201, through a line path DR4, where the line path DR4 includes the positive electrode 201b of the secondary battery cell 201, the terminal BM, the terminal VBM, the terminal BS2, the terminal BSM, the switch 29, the terminal P−, the switching circuit 13, the terminal B−, and the negative electrode 201a of the secondary battery cell 201.

The secondary battery protection apparatus 110 includes a current detecting circuit 44 that detects the current flowing into the internal line 86 under control by the balance control circuit 33. The secondary battery protection apparatus 110 also includes multiple discharge circuits 36 and 37 that are respectively provided for the secondary battery cells 201 and 202. The current detecting circuit 44 and the discharge circuits 36 and 37, which are provided outside a protection IC 121, are provided in a substrate. The discharge circuit 36 causes the secondary battery cell 201 to be discharged based on a result of current detection by the current detecting circuit 44. The discharge circuit 37 causes the secondary battery cell 202 to be discharged based on a result of current detection by the current detecting circuit 44.

In this example, the current detecting circuit 44 includes a resistor R7 provided in the internal line 86. The current detecting circuit 44 detects a voltage drop across the resistor R7, where the voltage drop results from the control current. The resistor R7 is inserted in a current path between the terminal BM (negative electrode 202a) and the terminal VBM.

The discharge circuit 36 includes a switch 41 that causes the secondary battery cell 201, among the secondary battery cells 201 and 202, to be discharged in accordance with the voltage drop across the resistor R7. The discharge circuit 36 also includes a resistor R9 coupled in series with the switch 41. A path that includes a series circuit of the switch 41 and the resistor R9 is coupled in parallel with the secondary battery cell 201. For example, the switch 41 is a P-channel MOS transistor with a source coupled to one end of the resistor R7, a drain coupled to one end of the resistor R9, and a gate coupled to another end (terminal VBM) of the resistor R7. Another end of the resistor R9 is coupled to the terminal VSS.

The discharge circuit 37 includes the switch 40 that causes the secondary battery cell 202, among the secondary battery cells 201 and 202, to be discharged in accordance with a voltage drop across the resistor R8. The discharge circuit 37 also includes the resistor R9 coupled in series with the switch 40. A path that includes a series circuit of the switch 40 and the resistor R8 is coupled in parallel with the secondary battery cell 202. For example, the switch 40 is an N-channel MOS transistor with a source coupled to one end of the resistor R8, a drain coupled to one end of the resistor R9, and a gate coupled to another end (terminal VBM) of the resistor R7. Another end of the resistor R8 is coupled to the terminal VDD.

When the balance control circuit 33 turns the switch 29 on, and thus a control current flows, in a case where the current detecting circuit 44 detects a voltage drop across the resistor R7 to be greater than or equal to a threshold, the discharge circuit 36 turns the switch 41 on, where a given path that includes the switch 41 is in parallel with the secondary battery cell 201. Thus, discharging is performed to achieve cell balancing. Accordingly, the discharge current is generated to flow from the positive electrode 201b to the negative electrode 201a of the secondary battery cell 201, through a line path DR5, where the line path DR5 includes the positive electrode 201b, the terminal BM, the resistor R9, the switch 41, the terminal B−, and the negative electrode 201a. The resistor R9 is an element used for adjusting (limiting) the magnitude of a given discharge current.

In the normal condition illustrated in FIG. 13, a case where the cell voltage for the secondary battery cell 202 is higher than the cell voltage for the secondary battery cell 201 is illustrated. When determining that the cell voltage for the secondary battery cell 202 is higher than the cell voltage for the secondary battery cell 201, the balance control circuit 33 switches a switch 28 from off to on, in order to reduce the cell voltage for the secondary battery cell 202. Thus, a given control current is generated to flow from a power source in the external device 140 to the positive electrode 201b of the secondary battery cell 201, through a line path CR4, where the line path CR4 includes the power source in the external device 140, the switch 28, the terminal BSM, the terminal BS2, the terminal VBM, the terminal BM, and the positive electrode 201b.

When the balance control circuit 33 turns the switch 28 on, and thus a given control current flows, in a case where the current detecting circuit 44 detects a voltage drop across the resistor R7 to be greater than or equal to a threshold, the discharge circuit 37 turns the switch 40 on, where a given path that includes the switch 40 is in parallel with the secondary battery cell 202. Thus, discharging is performed to achieve cell balancing. Accordingly, a given discharge current is generated to flow from the positive electrode 202b to the negative electrode 202a of the secondary battery cell 202, through a line path DR6, where the line path DR6 includes the positive electrode 202b, the resistor R1, the switch 40, the terminal BM, and the negative electrode 202a. The resistor R8 is an element used for adjusting (limiting) the magnitude of a given discharge current.

<Fifth embodiment>

Figure 14:
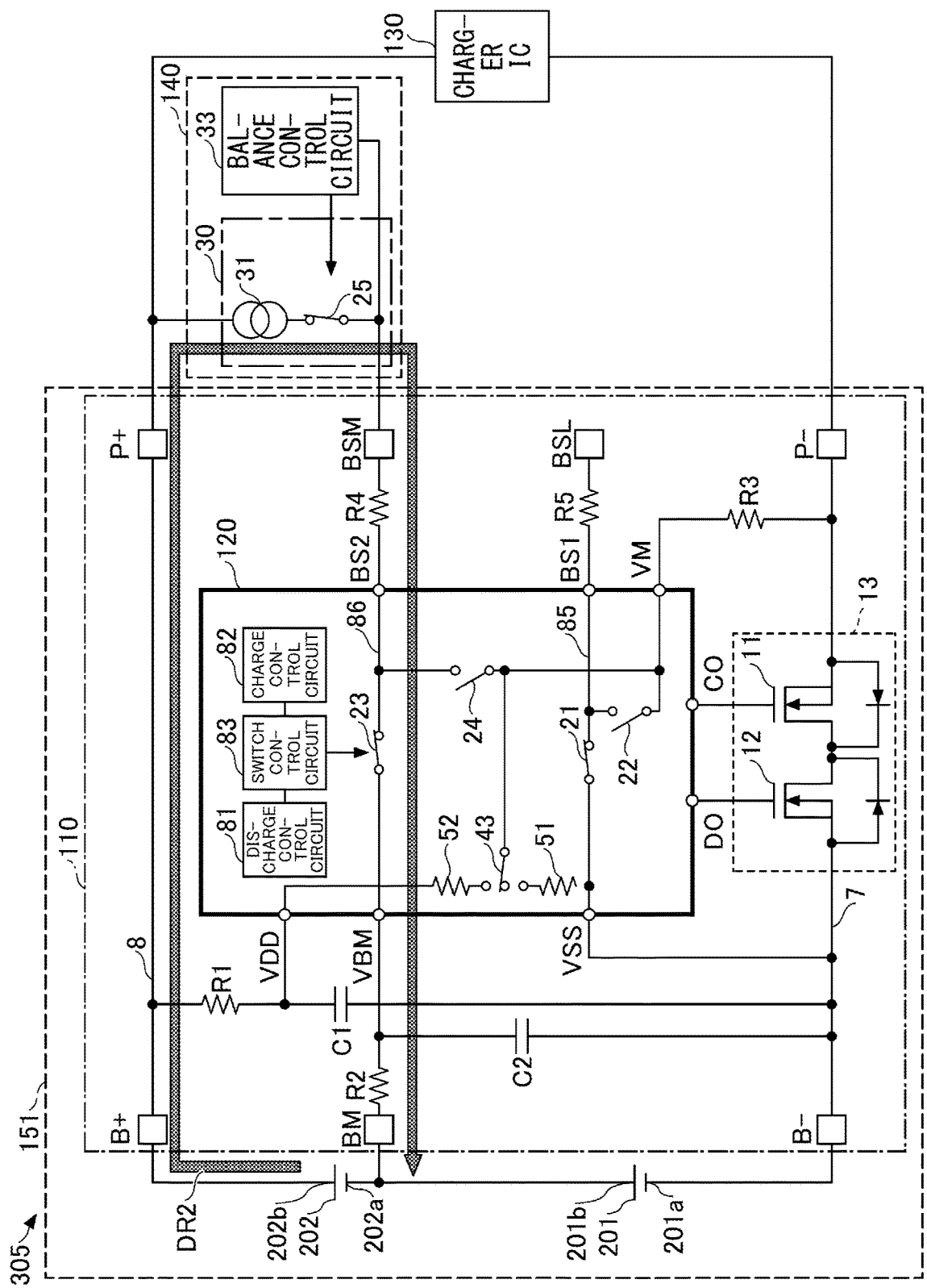
FIG. 14 is a diagram illustrating an example of the configuration of the control system according to a fifth embodiment, including a discharge path that enables discharging of the high potential-side secondary battery cell among the secondary battery cells, in the cell balance control.

FIG. 14 is a diagram illustrating an example of the configuration of the control system according to a fifth embodiment. FIG. 14 illustrates a given discharge path that enables discharging of the high potential-side secondary battery cell among the multiple secondary battery cells, in the cell balance control. In the fifth embodiment, description for the same configuration as that described in the above-described embodiments is omitted. Such description is incorporated herein by reference.

In a control system 305 illustrated in FIG. 14, the external device 140 includes a given current control circuit 30 that adjusts the current flowing into a given line path that includes a given internal line among the internal lines 85 and 86. The current control circuit 30 includes a current source 31, which is coupled at a node in the internal line 86, and includes a switch 25 coupled in series with the current source 31.

FIG. 14 illustrates a normal condition in which the anomaly of the secondary battery cells 201 and 202 is not detected. Under the normal condition illustrated in FIG. 14, the balance control circuit 33 causes the secondary battery cell 202 to be discharged with a discharge current flowing into a line path DR2 (see FIG. 14). Thus, the balance control circuit 33 adjusts the cell voltage for the secondary battery cell 202 to be close to the cell voltage for the secondary battery cell 201.

Under the normal condition illustrated in FIG. 14, a case where the cell voltage for the secondary battery cell 202 is higher than the cell voltage for the secondary battery cell 201 is illustrated. When determining that the cell voltage for the secondary battery cell 202 is higher than the cell voltage for the secondary battery cell 201, the balance control circuit 33 switches the switch 25 to an on-state, in order to reduce the cell voltage for the secondary battery cell 202. Thus, a given line path DR2 enables discharging of the secondary battery cell 202.

<Sixth embodiment>

Figure 15:
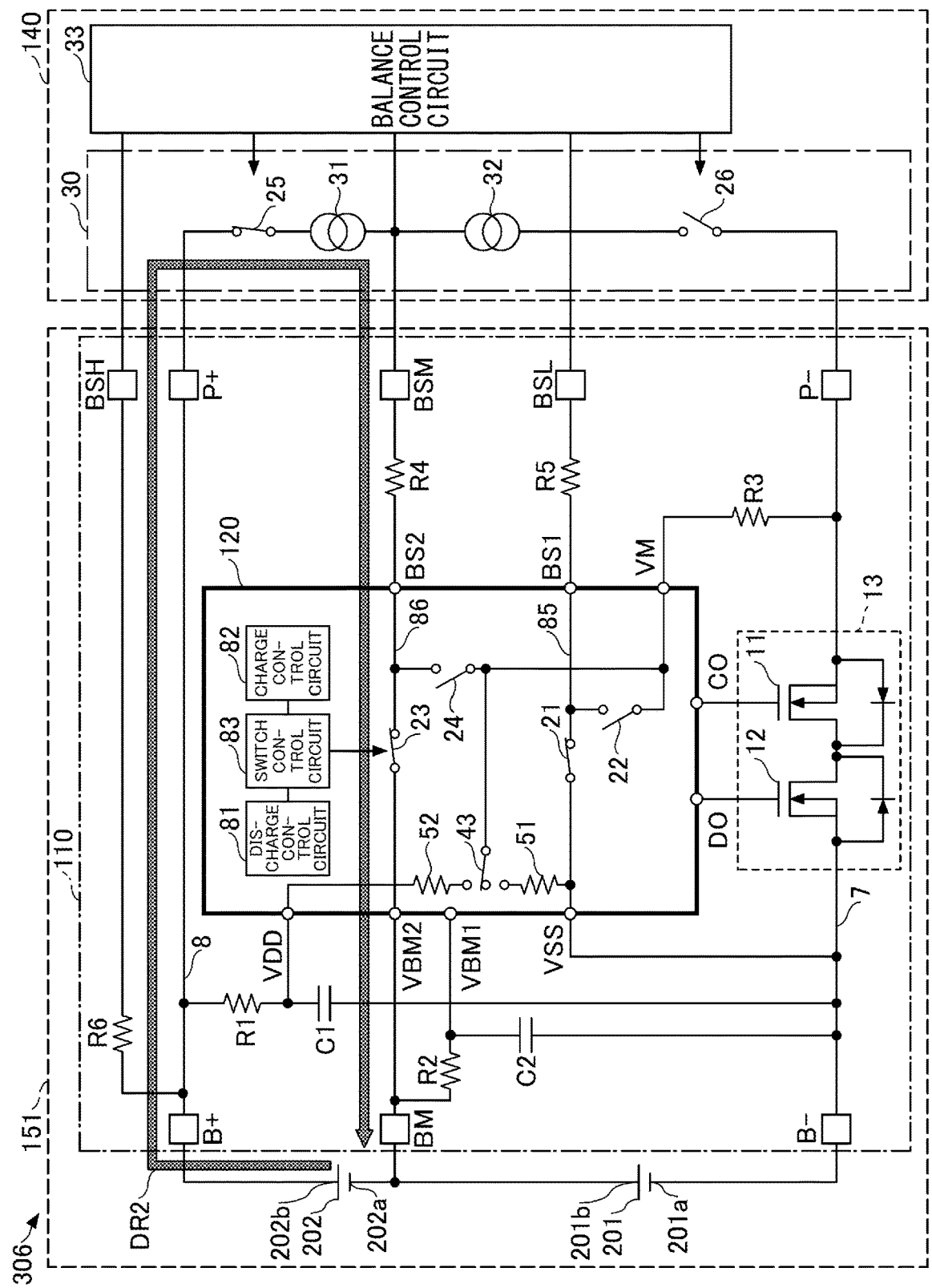
FIG. 15 is a diagram illustrating an example of the configuration of the control system according to a sixth embodiment, including a discharge path that enables discharging of the high potential-side secondary battery cell among the secondary battery cells, in the cell balance control.

FIG. 15 is a diagram illustrating an example of the configuration of the control system according to a sixth embodiment. FIG. 15 illustrates a given discharge path that enables discharging of the high potential-side secondary battery cell among the multiple secondary battery cells, in the cell balance control. In the sixth embodiment, description for the same configuration as that described in the above-described embodiments is omitted. Such description is incorporated herein by reference.

In a control system 306 illustrated in FIG. 15, the protection IC 120 includes a terminal VBM2, and a substrate includes a terminal BSH. The internal line 86 is coupled between the terminal VBM2 and the terminal BS2. The terminal VBM2 is coupled to the terminal BM without using any resistor R2, and a terminal VBM1 is coupled to the terminal BM via the resistor R2. The terminal BSH is coupled to the terminal B+ (positive electrode 202b) via a resistor R6. The terminal P+ is coupled to the terminal B+ (positive electrode 202b) without using any resistor R6.

The protection IC 120 detects a potential difference between the terminal VBM1 and the terminal VSS to thereby measure a given cell voltage for the secondary battery cell 201. Also, the protection IC 120 detects a potential difference between the terminal VBM1 and the terminal VDD to thereby measure a given cell voltage for the secondary battery cell 202. In such a manner, respective cell voltages for the secondary battery cells 201 and 202 are each measured using a line path different from the line path into which a given discharge current flows. Accordingly, accuracy in measuring the given cell voltage can be improved.

Moreover, by detecting a given potential difference between the terminal BSH and the terminal BSM, the balance control circuit 33 detects the cell voltage for the secondary battery cell 202. Also, by detecting a given potential difference between the terminal BSH and the terminal BSL, the balance control circuit 33 detects a total cell voltage VC for the secondary battery cells 201 and 202. Thus, a given cell voltage for the secondary battery cell 202, as well as a given total cell voltage VC for the secondary battery cells 201 and 202, are each measured using a given line path different from the line path into which a given discharge current flows. Accordingly, accuracy in measuring each of the given cell voltage and the given total cell voltage can be improved.

As described above, in each of the embodiments described above, with bypassing the switching circuit 13, the external device 140 can monitor respective cell voltages for the secondary battery cells 201 and 202, thereby increasing accuracy in monitoring the cell voltages. In this case, because the cell balance control is performed based on a monitored result, balancing among cell voltages of a plurality of secondary battery cells can be accurately performed. Further, each internal switch is provided in a given internal line to be used when the external device 140 measures a corresponding cell voltage among cell voltages for a plurality of secondary battery cells, and thus overcurrent flowing into the given internal line can be cut off by turning a given switch off.

Although the control system, the control method, and the integrated circuit for secondary battery protection have been described in the embodiments, the present disclosure is not limited to the embodiments described above. Various changes or alternatives, including substitutions or combinations of some or all of the different embodiments, can be made without departing from the scope described in the present disclosure.

For example, the charge control transistor 11 and the discharge control transistor 12 may be replaced with each other with respect to the locations in the drawing. The switching circuit 13 may also be embedded in the protection IC 120. The charger 130 may also be provided with respect to a given substrate.

What is claimed is:

1. A control system comprising:
   a plurality of secondary battery cells electrically coupled in series;
   a plurality of power paths each electrically coupled in series with a corresponding secondary battery cell among the plurality of secondary battery cells;
   at least one switching element inserted in a given power path;
   a secondary battery protection apparatus configured to control the switching element such that the secondary battery cells are protected; and
   a device configured to control balance among cell voltages for the respective secondary battery cells,
   wherein the secondary battery protection apparatus includes:
   an anomaly detecting circuit configured to detect an anomaly of the secondary battery cells;
   one or more monitoring terminals each provided in a path different from the power paths, each monitoring terminal being operable for monitoring a potential at a negative electrode of a given secondary battery cell among the plurality of the secondary battery cells;
   one or more internal lines, each internal line being between the negative electrode of the given secondary battery cell and a given monitoring terminal; and
   one or more internal switches, each internal switch being provided in a given internal line and configured to be turned on or off based on a result of anomaly detection performed by the anomaly detecting circuit, and
   wherein the device includes a balance control circuit configured to adjust, based on potentials monitored by the one or more monitoring terminals, a current flowing into a line path that includes a corresponding internal line among the one or more internal lines, the balance control circuit being configured to control the balance among the cell voltages for the plurality of the secondary battery cells, based on the adjusted current.

2. The control system according to claim 1, wherein the secondary battery protection apparatus includes:
   a current detecting circuit configured to detect the current flowing into the line path, under control by the balance control circuit, and
   a plurality of discharge circuits provided for the respective secondary battery cells, each discharge circuit being configured to cause a corresponding secondary battery cell, among the secondary battery cells, to be discharged based on a result of current detection performed by the current detecting circuit.

3. The control system according to claim 2, wherein the current detecting circuit includes a resistor provided in a given internal line, and
   wherein each of the plurality of discharge circuits includes a transistor that causes a corresponding secondary battery cell among the secondary battery cells, to be discharged in accordance with a voltage drop across the resistor.

4. The control system according to claim 1, further comprising a current control circuit configured to adjust the current flowing into the line path,
   wherein the balance control circuit is configured to control the current control circuit such that balancing among the cell voltages for the plurality of secondary battery cells is achieved.

5. The control system according to claim 4, wherein the current control circuit includes a switching circuit configured to switch between conduction and interruption of the line path, and
   wherein the balance control circuit is configured to control the switching circuit such that balancing among the cell voltages for the plurality of secondary battery cells is achieved.

6. The control system according to claim 5, wherein the switching circuit includes a plurality of switches, each secondary battery cell being in parallel with a path that includes a given switch among the plurality of switches.

7. The control system according to claim 4, wherein the current control circuit includes a plurality of current sources and a plurality of switches electrically coupled in series with the respective current sources, each secondary battery cell being in parallel with a path that includes a given current source among the plurality of current sources, and wherein the balance control circuit is configured to control the plurality of current sources and the plurality of switches, such that balancing among the cell voltages for the plurality of secondary battery cells is achieved.

8. The control system according to claim 1, wherein the plurality of the secondary battery cells are a first secondary battery cell and a second secondary battery cell, the first secondary battery cell including a first positive electrode and a first negative electrode, the second secondary battery cell including a second positive electrode and a second negative electrode electrically coupled to the first positive electrode of the first secondary battery cell, and a potential at the first negative electrode of the first secondary battery cell being lower than a potential at the second negative electrode of the second secondary battery cell, and wherein the one or more monitoring terminals include a monitoring terminal operable for monitoring the potential at the second negative electrode of the second secondary battery cell.

9. A control method for execution by a device that monitors potentials at one or more negative electrodes of a plurality of secondary battery cells electrically coupled in series, each secondary battery cell being protected by a secondary battery protection circuit that controls at least one switching element provided in a given power path among a plurality of power paths, each power path being electrically coupled in series with a corresponding secondary battery cell among the plurality of secondary battery cells, the secondary battery protection circuit including:

an anomaly detecting circuit configured to detect an anomaly of the secondary battery cells, one or more monitoring terminals each provided in a path different from the power paths, each monitoring terminal being operable for monitoring a potential at a negative electrode of a given secondary battery cell among the plurality of the secondary battery cells, one or more internal lines, each internal line being between the negative electrode of the given secondary battery cell and a given monitoring terminal, and one or more internal switches, each internal switch being provided in a given internal line and configured to be turned on or off based on a result of anomaly detection performed by the anomaly detecting circuit, and the control method comprising:

adjusting, based on potentials monitored by the one or more monitoring terminals, a current flowing into a line path that includes a corresponding internal line among the one or more internal lines; and controlling balance among the cell voltages for the plurality of the secondary battery cells, based on the adjusted current.

10. An integrated circuit for secondary battery protection, comprising:

a plurality of power paths each electrically coupled in series with a corresponding secondary battery cells among a plurality of secondary battery cells electrically coupled in series;

at least one switching element inserted in a given power path;

one or more control circuits configured to control the at least one switching element such that the plurality of secondary battery cells are protected;

an anomaly detecting circuit configured to detect an anomaly of the secondary battery cells;

one or more monitoring terminals each provided in a path different from the power paths, each monitoring terminal being operable for monitoring a potential at a negative electrode of a given secondary battery cell among the plurality of the secondary battery cells;

one or more internal lines, each internal line being between the negative electrode of the given secondary battery cell and a given monitoring terminal; and one or more internal switches, each internal switch being provided in a given internal line and configured to be turned on or off based on a result of anomaly detection performed by the anomaly detecting circuit, wherein the one or more monitoring terminals are configured to output respective monitored potentials, upon occurrence of a condition in which an external device adjusts, based on the potentials monitored by the one or more monitoring terminals, a current flowing into a line path that includes a corresponding internal line among the one or more internal lines, in conjunction with a condition in which the external device controls balance among the cell voltages for the plurality of the secondary battery cells, based on the adjusted current.

* * * * *